(12) United States Patent
Nakanishi et al.

(10) Patent No.: US 10,279,769 B2
(45) Date of Patent: May 7, 2019

(54) AIRBAG DEVICE

(71) Applicant: TOYODA GOSEI CO., LTD., Kiyosu-shi, Aichi-ken (JP)

(72) Inventors: Hiroyuki Nakanishi, Kiyosu (JP); Wataru Miura, Kiyosu (JP); Naohiko Ishiguro, Kiyosu (JP); Ryotaro Ishida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 65 days.

(21) Appl. No.: 15/635,957

(22) Filed: Jun. 28, 2017

(65) Prior Publication Data
US 2018/0001863 A1 Jan. 4, 2018

(30) Foreign Application Priority Data

Jun. 30, 2016 (JP) .................. 2016-130556

(51) Int. Cl.
*B60R 21/203* (2006.01)
*B60R 21/205* (2011.01)
(Continued)

(52) U.S. Cl.
CPC .......... *B60R 21/231* (2013.01); *B60R 21/203* (2013.01); *B60R 21/205* (2013.01);
(Continued)

(58) Field of Classification Search
CPC .... B60R 2021/0009; B60R 2021/0023; B60R 2021/0048; B60R 2021/23308;
(Continued)

(56) References Cited

U.S. PATENT DOCUMENTS 3,642,303 A * 2/1972 Irish ...................... B60R 21/233
280/730.1
5,562,302 A * 10/1996 Turnbull ............... B60R 21/231
280/730.1
(Continued)

FOREIGN PATENT DOCUMENTS

JP 2008-044480 A 2/2008
JP 2008-149965 A 7/2008
JP 2013-141886 A 7/2013

*Primary Examiner* — Laura Freedman
(74) *Attorney, Agent, or Firm* — Posz Law Group, PLC

(57) ABSTRACT

An airbag device includes an airbag stored in a storage part provided in front of an occupant seated on a seat. The airbag has an occupant protecting section configured to protect the occupant on a rear surface at the time of completion of inflation; the occupant protecting section includes: an upper half body restraining surface configured to receive an upper half body of the occupant; and a head receiving section formed in a left region and a right region of a center in a left-right direction of the occupant protecting section to protrude rearward from the upper half body restraining surface, in a region above the upper half body restraining surface. The head receiving section is configured so that a part between a left restraining surface and a right restraining surface upon completion of inflation is continued from the upper half body restraining surface.

8 Claims, 19 Drawing Sheets

(51) Int. Cl.
*B60R 21/231* (2011.01)
*B60R 21/233* (2006.01)
*B60R 21/239* (2006.01)
*B60R 21/2338* (2011.01)
*B60R 21/00* (2006.01)

(52) U.S. Cl.
CPC .......... *B60R 21/233* (2013.01); *B60R 21/239* (2013.01); *B60R 21/2338* (2013.01); *B60R 2021/0009* (2013.01); *B60R 2021/0023* (2013.01); *B60R 2021/0048* (2013.01); *B60R 2021/2395* (2013.01); *B60R 2021/23308* (2013.01); *B60R 2021/23324* (2013.01); *B60R 2021/23382* (2013.01)

(58) Field of Classification Search
CPC .. B60R 2021/23324; B60R 2021/2338; B60R 21/203; B60R 21/205; B60R 21/231; B60R 21/233; B60R 21/2338; B60R 21/239; B60R 2021/2395
See application file for complete search history.

(56) References Cited

U.S. PATENT DOCUMENTS

| | | | |
|---|---|---|---|
| 6,786,505 B2 | 9/2004 | Yoshida | |
| 6,971,666 B2* | 12/2005 | Akiyama | B60R 21/231 280/729 |
| 7,360,789 B2* | 4/2008 | Bito | B60R 21/205 280/729 |
| 7,631,891 B2* | 12/2009 | Washino | B60R 21/203 280/731 |
| 7,654,568 B2* | 2/2010 | Yamada | B60R 21/231 280/731 |
| 8,215,671 B2* | 7/2012 | Bergstrom | B60R 21/231 280/729 |
| 8,430,425 B2* | 4/2013 | Marable | B60R 21/233 280/732 |
| 8,439,399 B2* | 5/2013 | Abramoski | B60R 21/231 280/730.1 |
| 8,678,429 B2* | 3/2014 | Nagasawa | B60R 21/233 280/729 |
| 9,150,186 B1* | 10/2015 | Belwafa | B60R 21/233 |
| 9,205,798 B1* | 12/2015 | Jindal | B60R 21/16 |
| 9,358,945 B2* | 6/2016 | Yamada | B60R 21/233 |
| 9,376,084 B2* | 6/2016 | Choi | B60R 21/233 |
| 9,428,139 B2* | 8/2016 | Yamada | B60R 21/233 |
| 9,505,372 B2* | 11/2016 | Yamada | B60R 21/2338 |
| 9,550,465 B1* | 1/2017 | El-Jawahri | B60R 21/01512 |
| 9,650,011 B1* | 5/2017 | Belwafa | B60R 21/233 |
| 9,663,060 B1* | 5/2017 | Deng | B60R 21/203 |
| 9,676,355 B2* | 6/2017 | Kruse | B60R 21/0136 |
| 9,738,243 B2* | 8/2017 | Fukawatase | B60R 21/2338 |
| 9,758,123 B2* | 9/2017 | Yamada | B60R 21/2338 |
| 9,827,939 B1* | 11/2017 | Roychoudhury | B60R 21/239 |
| 9,845,067 B2* | 12/2017 | Morris | B60R 21/233 |
| 10,023,144 B2* | 7/2018 | Taguchi | B60R 21/205 |
| 10,029,643 B2* | 7/2018 | Spahn | B60R 21/205 |
| 10,065,594 B2* | 9/2018 | Fukawatase | B60R 21/233 |
| 2006/0163848 A1* | 7/2006 | Abe | B60R 21/231 280/729 |
| 2017/0120854 A1* | 5/2017 | Fukawatase | B60R 21/2035 |
| 2017/0355344 A1* | 12/2017 | Choi | B60R 21/231 |
| 2018/0111581 A1* | 4/2018 | Wang | B60R 21/231 |
| 2018/0111583 A1* | 4/2018 | Jaradi | B60R 21/231 |
| 2018/0126945 A1* | 5/2018 | Aranzulla | B60R 21/233 |
| 2018/0222431 A1* | 8/2018 | Nakanishi | B60R 21/231 |
| 2018/0251093 A1* | 9/2018 | Rose | B60R 21/205 |

* cited by examiner

A.

B.

C.

SECTION TAKEN ALONG LINE A-A

AIRBAG DEVICE

CROSS-REFERENCE TO RELATED APPLICATION(S)

This application is based upon and claims the benefit of priority from Japanese Patent Application No. 2016-130556, filed on Jun. 30, 2016, the entire contents of which are incorporated herein by reference.

BACKGROUND

1. Field of the Invention

The present invention relates to an airbag device provided with an airbag which is stored in a storage part provided in front of an occupant seated on a seat, and is configured to be inflated and expanded to protrude toward the rear side of the vehicle by making an inflation gas flow into the interior, thereby making it possible to protect the occupant.

2. Description of the Related Art

Conventionally, there has been an airbag device in which two substantially semicircular column-shaped parts having an axial direction substantially along a vertical direction are arranged side by side in a region on the rear end side upon completion of inflation on a left-right direction side, and the region on the rear end side upon completion of inflation is set as an occupant protecting section (for example, refer to JP-A-2013-141886). That is, in the conventional airbag device, the occupant protecting section is configured such that a recessed portion recessed toward the front at the rear end side of the airbag upon completion of the inflation is disposed to extend approximately in the up-down direction over substantially the entire upper and lower regions at a substantially center in the left-right direction, and a protruding portion protruding substantially in a semicircular column shape is disposed on both the left and right sides of the recessed portion so as to substantially extend in the up-down direction over substantially the entire upper and lower regions. The recessed portion and the protruding portion of the occupant protecting section is provided to protect the head of the occupant even when the occupant moves obliquely forward at the time of an oblique collision or an offset collision of the vehicle.

The conventional airbag device is configured so that the head of the occupant moving obliquely forward is received by being caused to enter the recessed portion of the occupant protecting section at the time of an oblique collision, an offset collision or the like of the vehicle. However, since the recessed portion and the protruding portion are continuously formed over the entire upper and lower regions of the occupant protecting section, it is difficult to sufficiently secure the depth of the depression of the recessed portion, in other words, the protruding amount of the protruding portion, and there is room for improvement from the viewpoint of accurately protecting the head of the occupant moving obliquely forward.

SUMMARY

The present invention has been made to solve to the aforementioned problems, and an object thereof is to provide an airbag device capable of smoothly protecting the head of the occupant moving obliquely forward by a completely inflated airbag.

According to the present invention, there is provided an airbag device including an airbag stored in a storage part provided in front of an occupant seated on a seat, the airbag configured to deploy and inflate to protrude toward a rear side of a vehicle by flowing of an inflation gas therein, to protect the occupant, wherein: the airbag has an occupant protecting section configured to protect the occupant on a rear surface at the time of completion of inflation; the occupant protecting section includes: an upper half body restraining surface, disposed in front of the occupant at the time of completion of inflation, configured to receive the upper half body of the occupant; and a head receiving section formed in a left region and a right region of a center in a left-right direction of the occupant protecting section to protrude rearward from the upper half body restraining surface, in a region above the upper half body restraining surface, the head receiving section having a left restraining surface and a right restraining surface configured to receive a side surface of a head; and the head receiving section is configured so that a part between the left restraining surface and the right restraining surface upon completion of inflation is continued from the upper half body restraining surface.

In the airbag device of the present invention, the head receiving section that covers the left and right sides of the occupant's head to receive the head upon completion of inflation of the airbag is formed to protrude rearward from the upper half body restraining surface, and the head receiving section is configured to receive the left and right side surfaces of the head by the left restraining surface and the right restraining surface. That is, in the airbag device of the present invention, the head receiving section is disposed so as to protrude toward the occupant on the rear side from the upper half body restraining surface when the inflation of the airbag is completed. In other words, it is possible to set the separation distance between the head receiving section and the head of the occupant seated on the seat to be relatively small. Therefore, it is possible to quickly and accurately receive the head of the occupant moving obliquely forward at the time of an oblique collision or an offset collision of the vehicle with the left restraining surface or the right restraining surface of the head receiving section. Further, in the airbag device of the present invention, since the head receiving section is formed to protrude rearward from the upper half body restraining surface upon completion of inflation of the airbag, the increase in the volume can be suppressed as compared with the conventional airbag in which the recessed portion and the protruding portion are formed over the entire upper and lower regions. Furthermore, in the airbag device of the present invention, in the airbag which is completely inflated, the upper half body restraining surface is disposed at a position on the front side of the head receiving section and has no large irregularities. Thus, the upper half body of the occupant moving forward can be received widely and accurately by the upper half body restraining surface when the inflation of the airbag is completed.

Therefore, in the airbag device of the present invention, the head of the occupant moving obliquely forward can be protected smoothly by the inflated airbag.

In the airbag device according to the present invention, the left restraining surface and the right restraining surface of the head receiving section are respectively arranged in the region on the left side and the region on the right side from the center of the occupant protecting section in the left-right direction. The head receiving section is configured so that the part between the left restraining surface and the right restraining surface is continued from the upper half body restraining surface, in other words, the head receiving section is not configured to be recessed from the upper half body restraining surface. Thus, it is possible to accurately protect the head without difficulty, by making the head of the occupant moving forward enter the gap between the left restraining surface and the right restraining surface even at the time of a frontal collision of the vehicle.

Further, in the airbag device of the present invention, the airbag includes an airbag main body in which a lower side of the rear surface upon completion of inflation is set as the upper half body restraining surface, and the head receiving section formed to partially protrude from the upper side on the rear surface of the airbag main body upon completion of inflation, the head receiving section includes a left restraining section having the left restraining surface, and a right restraining section having the right restraining surface, and the left restraining section and the right restraining section may be arranged such that the basic side upon completion of inflation is positioned on the center side in the left-right direction from the left edge and the right edge on the rear surface of the airbag main body in a state in which the airbag upon completion of inflation is viewed from above, and protrude rearward from the upper half body restraining surface.

In the airbag device having the above-described configuration, the left restraining section and the right restraining section are configured such that the base portion is positioned on the center side in the left-right direction rather than the left edge and the right edge of the rear surface of the airbag main body. In other words, in the region on the left and right outer sides of the left restraining section and the right restraining section, recessed portions which are recessed inward in the left-right direction are formed between the upper part of the airbag main body. Therefore, after the left restraining section and the right restraining section temporarily are deployed so that the front ends are directed outward in the left-right direction and then inflated so that the front ends approach each other in accordance with the tension generated on the outer surface of the airbag. As a result, the head of the occupant can be smoothly interposed between the left and right restraining sections and from both the left and right sides, and the head of the occupant can be smoothly restrained.

Still furthermore, in the airbag device having the above-described configuration, the left restraining surface and the right restraining surface may be disposed so as to be inclined with respect to a front-rear direction to be expanded toward the front end side when the inflation of the airbag is completed. With this configuration, the left restraining surface or the right restraining surface is disposed so as to face the head of the occupant moving obliquely forward. Accordingly, as compared with the case where the left restraining surface and the right restraining surface are disposed substantially along the front-rear direction upon completion of inflation of the airbag, it is possible to accurately restrain the head of the occupant moving obliquely forward with a wide surface, by the left restraining surface or the right restraining surface. In the airbag device having the above-described configuration, when the left restraining surface or the right restraining surface comes into contact with the head of the occupant upon completion of the inflation of the airbag, the left restraining section or the right restraining section is rotationally moved so as to direct the front end toward the other left restraining section or the right restraining section. Thus, it is preferable that the head of the occupant can be more smoothly interposed by the left restraining section and the right restraining section.

Still further, in the airbag device having the above-described configuration, if the left restraining surface and the right restraining surface are configured so that the base portions are brought into contact with each other when the inflation of the airbag is completed, the head of the occupant can be received by both of the left restraining surface and the right restraining surface at the time of receiving the head, and the head of the occupant can be more smoothly restrained by the left restraining surface and the right restraining surface.

Specifically, the airbag may be folded and stored in a storage part provided in an instrument panel disposed in front of an occupant seated on a passenger seat, and the airbag may be stored in the storage part provided in the instrument panel disposed in front of a driver seated on the driver's seat.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
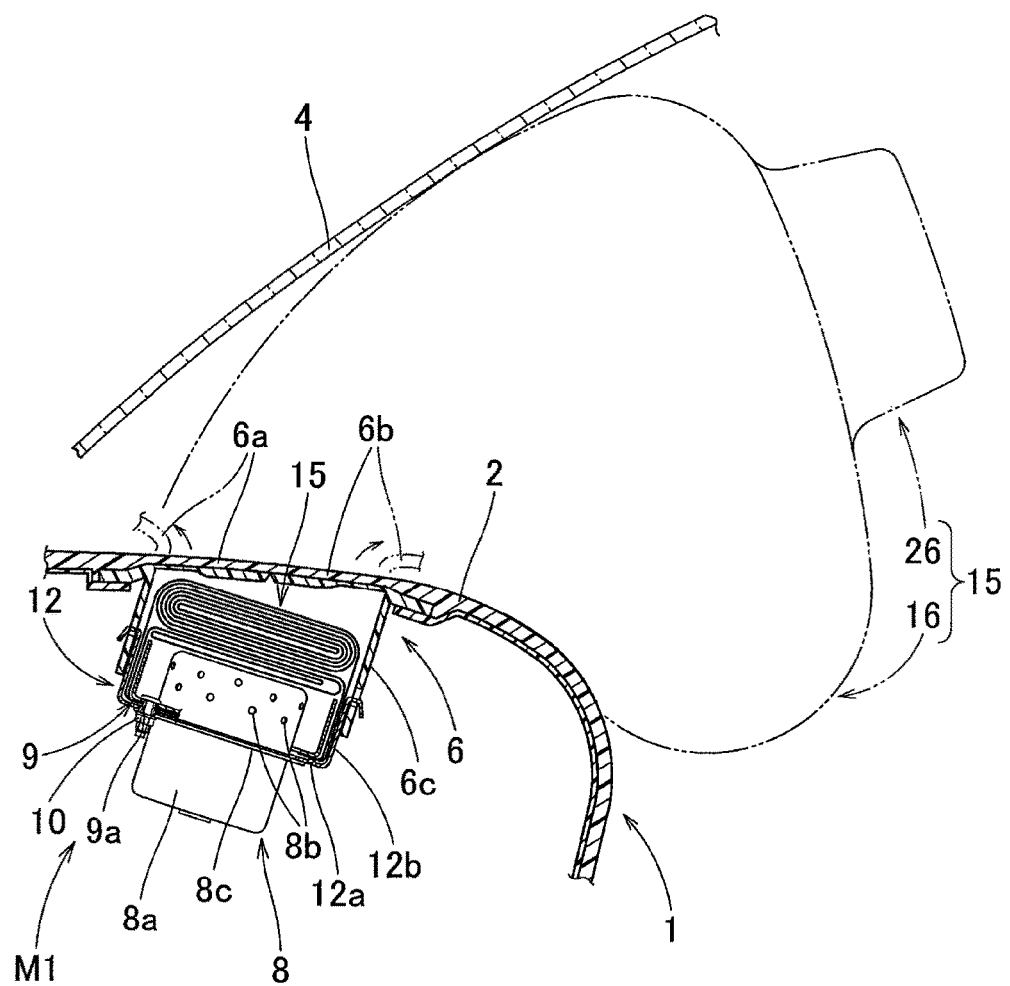
FIG. 1 is a schematic longitudinal sectional view of a state in which a passenger seat airbag device according to a first embodiment of the present invention is mounted on a vehicle.

Hereinafter, an embodiment of the present invention will be described with reference to the drawings. In the first embodiment, a passenger seat airbag device M1 disposed in front of a passenger seat will be adopted and illustrated as an example of an airbag device. As illustrated in FIG. 1, the passenger seat airbag device M1 of the first embodiment is a top-mounted type which is disposed inside the upper surface 2 of an instrument panel 1. In the first embodiment, the directions of the front and rear, up and down, right and left are coincident with the front-rear direction, the up-down direction, and the left-right direction of the vehicle, unless otherwise specified.

As illustrated in FIG. 1, the passenger seat airbag device M1 of the first embodiment includes a folded airbag 15, an inflator 8 which supplies the inflation gas to the airbag 15, a case 12 as a storage part which stores and holds the airbag 15 and the inflator 8, a retainer 9 which mounts the airbag 15 and the inflator 8 to the case 12, and an airbag cover 6 which covers the folded airbag 15.

The airbag cover 6 is integrally formed with the instrument panel 1 made of a synthetic resin so that the front and rear two doors 6a and 6b are pushed and opened by the airbag 15 when the airbag 15 is deployed and inflated. Further, a connecting wall section 6c connected to the case 12 is formed around the doors 6a and 6b of the airbag cover 6.

As illustrated in FIG. 1, the inflator 8 is configured to include a substantially columnar main body portion 8a having a plurality of gas discharge ports 8b and a flange section 8c for mounting the inflator 8 to the case 12. In the case of the embodiment, the inflator 8 is configured to operate at the time of a frontal collision, an oblique collision and an offset collision of the vehicle.

As illustrated in FIG. 1, the case 12 as a storage part is disposed on the lower surface side of the instrument panel 1 disposed in front of the occupant MP1 seated on the passenger seat PS (see FIG. 11), is formed in a substantially rectangular parallelepiped shape made of sheet metal having a rectangular opening on the upper end side, and includes a substantially rectangular plate-like bottom wall section 12a in which the inflator 8 is inserted and mounted from the lower side, and a peripheral wall section 12b extending upward from the outer peripheral edge of the bottom wall section 12a to lock the connecting wall section 6c of the airbag cover 6. In the case of the embodiment, the airbag 15 and the inflator 8 are mounted to the bottom wall section 12a of the case 12, by using a bolt 9a of the retainer 9 disposed in the airbag 15 as mounting means, and by causing the bolt 9a to penetrate through the peripheral edge of the gas inflow port 19 of the airbag 15, the bottom wall section 12a of the case 12, and the flange section 8c of the inflator 8 to fasten the bolt 9a with the nut 10.

In the embodiment, as illustrated in FIGS. 2 to 7, the airbag 15 includes an airbag main body 16, a head receiving section 26 partially protruding from the airbag main body 16 when the inflation is completed, and front and rear tether 37 and left and right tethers 45 and 46 which are disposed in the airbag main body 16 to regulate the inflation completion shape of the airbag main body 16.

Figure 2:
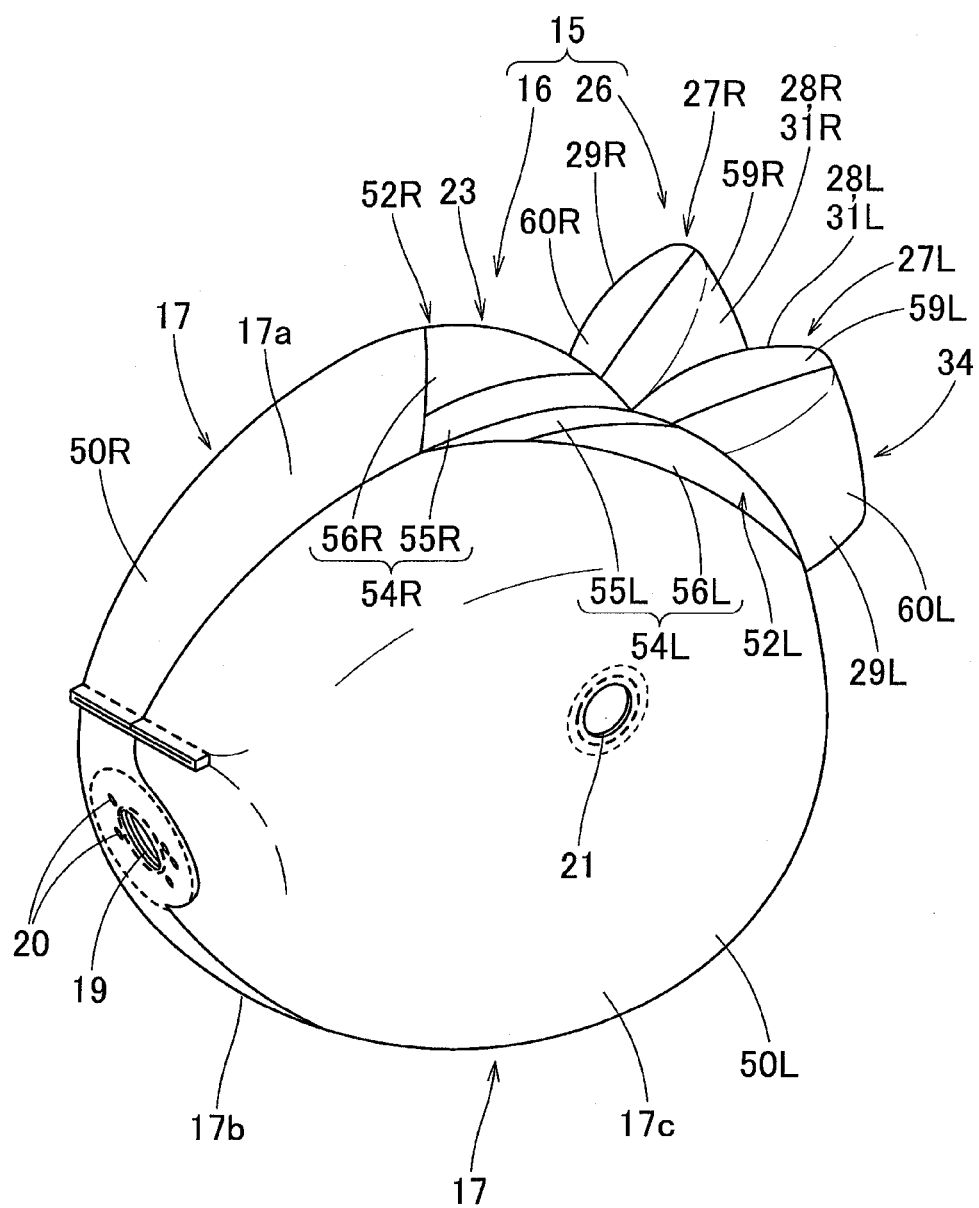
FIG. 2 is a schematic perspective view of a state in which the airbag used in the passenger seat airbag device of the first embodiment is inflated as a single body, as viewed from the left front side.
Figure 3:
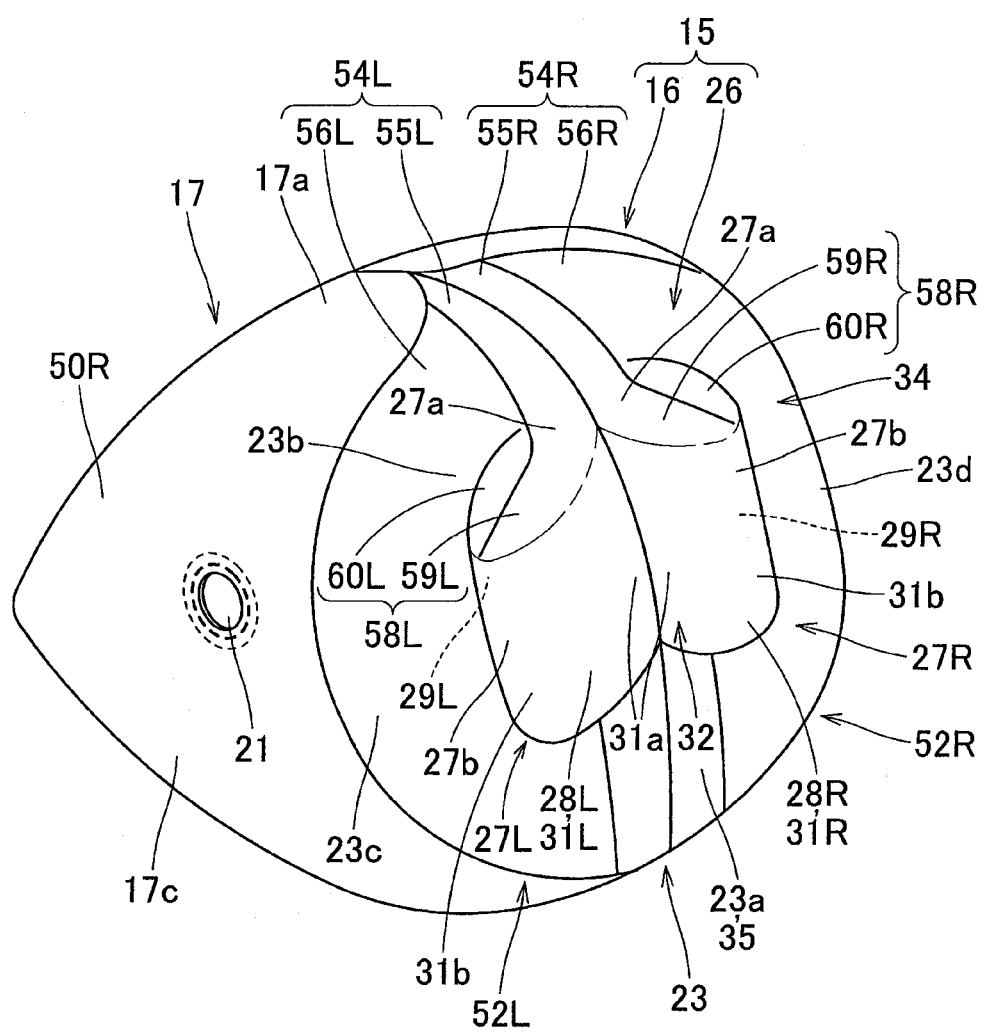
FIG. 3 is a schematic perspective view of the airbag of FIG. 2 as viewed from the left rear side in the state of being inflated as the single body.
Figure 4:
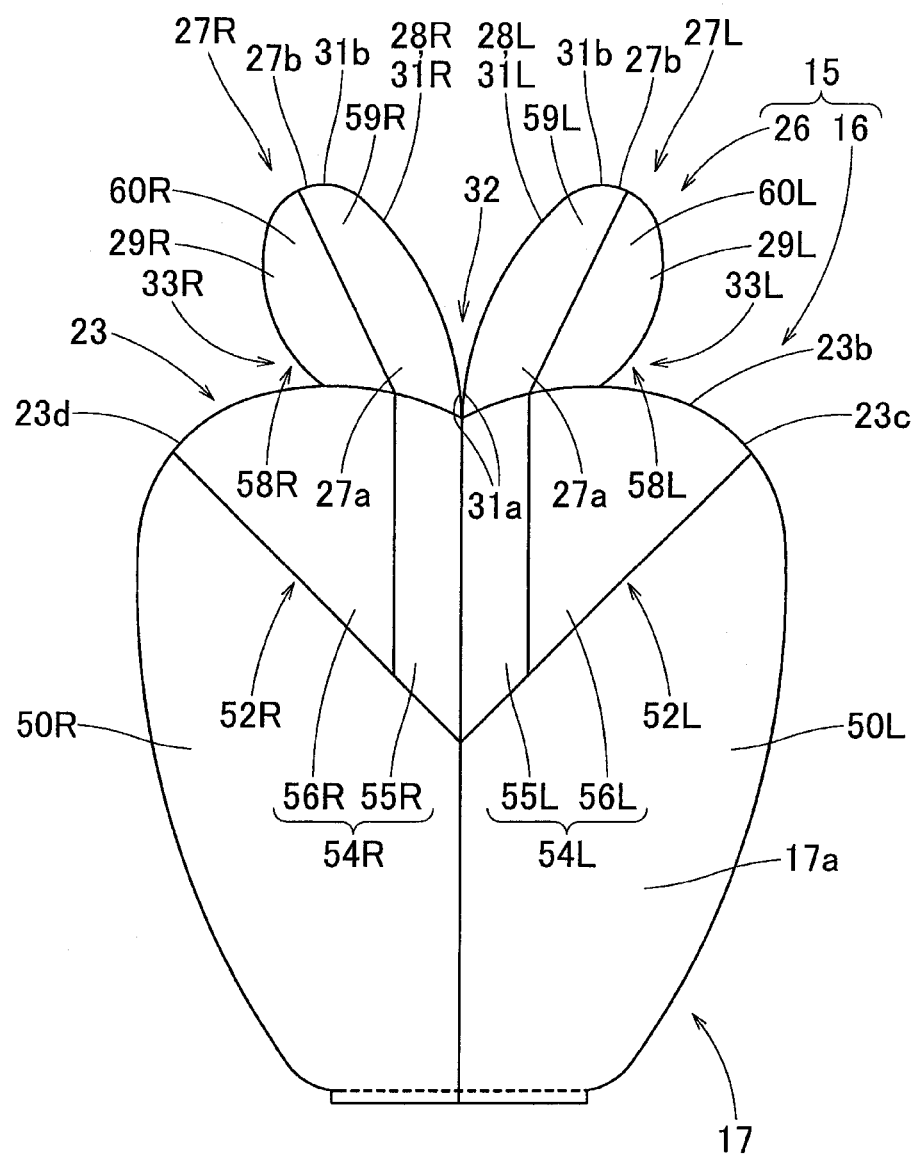
FIG. 4 is a plan view of the state in which the airbag of FIG. 2 is inflated as the single body.

As indicated by two-dot chain lines in FIG. 1, the airbag main body 16 is configured as a substantially bag-like shape that can be disposed to mainly block the space between the upper surface 2 of the instrument panel 1 and the windshield 4 above the instrument panel 1, when the inflation is completed. Specifically, as illustrated in FIGS. 2 to 4, the shape of the airbag main body 16 at the time of completion of inflation is a substantially quadrangular pyramid shape in which the top portion is disposed on the front end side, and includes a rear side wall section 23 disposed on the rear side which is the occupant MP1 side when the inflation is completed, and a peripheral wall section 17 having a tapered shape extending forward from the peripheral edge of the rear side wall section 23 and converging toward the front end side.

The peripheral wall section 17 is a part disposed to block the space between the upper surface 2 of the instrument panel 1 and the windshield 4 above the instrument panel 1 when the inflation of the airbag 15 is completed, and includes an upper wall section 17a and a lower wall section 17b disposed long the substantially left-right direction on both upper and lower sides, and a left wall section 17c and a right wall section 17d disposed substantially along the front-rear direction on both left and right sides. In the vicinity of the front end of the lower wall section 17b near the front end upon completion of the inflation of the airbag main body 16, a gas inflow port 19, which is opened in a substantially circular shape so as to allow an inflation gas to flow therein and has a peripheral edge mounted to the bottom wall section 12a of the case 12, is formed at a position that is substantially at the center in the left-right direction. A plurality of (four, in the case of the embodiment) mounting holes 20 for inserting the bolt 9a of the retainer 9 to mount the peripheral edge of the gas inflow port 19 to the bottom wall section 12a of the case 12 are formed on the peripheral edge of the gas inflow port 19. A vent hole 21 for exhausting surplus inflation gas flowing into the airbag main body 16 is formed in the left wall section 17c and the right wall section 17d of the peripheral wall section 17.

Figure 10:
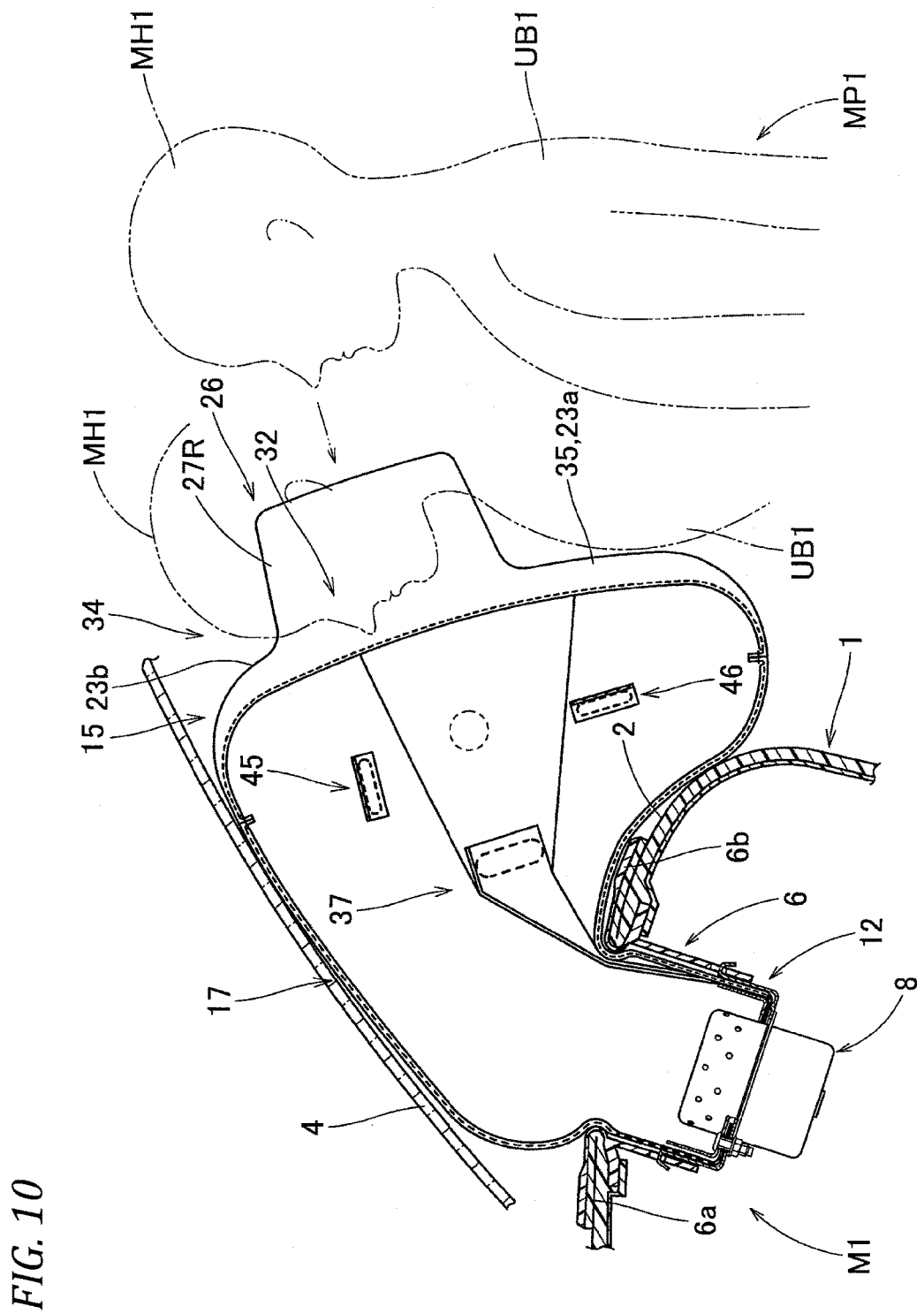
FIG. 10 is a schematic longitudinal sectional view illustrating a state in which the airbag is completely inflated in the passenger seat airbag device of the first embodiment.

As illustrated in FIG. 10, the rear side wall section 23 is disposed along the substantially vertical direction on the rear end side of the airbag main body 16, which is the occupant MP1 side, when the inflation of the airbag main body 16 is completed. In the case of the embodiment, the rear side wall section 23 is configured so that the left and right centers are slightly recessed forward substantially over the entire upper and lower regions when the inflation of the airbag 15 is completed.

The head receiving section 26 is disposed to protrude rearward from the upper region (upper part 23b) of the rear side wall section 23 of the airbag main body 16 upon completion of inflation, and in detail, the head receiving section 26 is formed to protrude rearward from the position slightly above the center in the up-down direction at the substantially center in the left-right direction of the rear side wall section 23 at the time of completion of the inflation of the airbag 15. Specifically, as illustrated in FIGS. 2 to 6, the head receiving section 26 includes a left restraining section 27L which is disposed so as to protrude leftward and rearward, and a right restraining section 27R disposed so as to protrude rightward and rearward when the airbag 15 is completely inflated. Both of the left restraining section 27L and the right restraining section 27R have external shapes of a substantially rectangular plate shape which is slightly tapered toward the rear end 27b side at the time of the completion of inflation, and include a left inner side wall section 28L and a right inner side wall section 28R disposed so as to face each other on the inner side in the left-right direction, and a left outer side wall section 29L and a right outer side wall section 29R disposed on the outer side in the left-right direction. The left restraining section 27L and the right restraining section 27R are formed to have a substantially V shape as viewed from the up-down direction so as to expand the rear end portions 27b and 27b, while bringing such that the base portions 28a and 28a of the left inner side wall section 28L and the right inner side wall section 28R into contact with each other at a position which is substantially the center in the left-right direction of the rear side wall section 23 (see FIGS. 4 and 6). That is, in this embodiment, the left restraining section 27L is disposed in a region on the left side of the center in the left-right direction of the rear side wall section 23, and the right restraining section 27R is disposed in a region on the right side of the center in the left-right direction of the rear side wall section 23.

Figure 11:
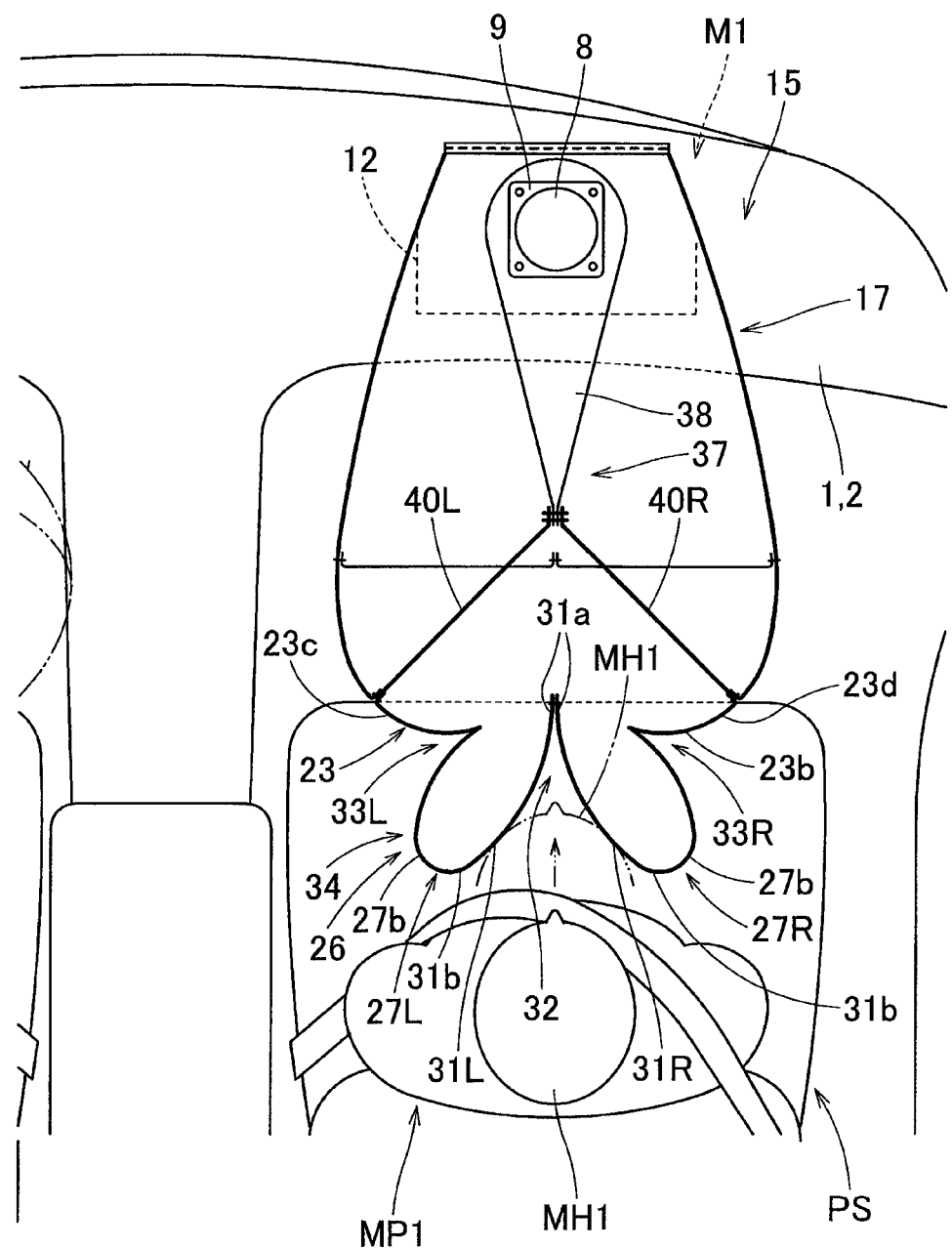
FIG. 11 is a schematic transverse sectional view illustrating a state in which the airbag is completely inflated in the passenger seat airbag device of the first embodiment.

In the case of the embodiment, the external shapes of the left restraining section 27L and the right restraining section 27R upon completion of inflation are substantially symmetrical, and in detail, as viewed from the side (see FIG. 5), the left restraining section 27L and the right restraining section 27R are disposed so that the center on the up-down direction side is positioned slightly above the center on the up-down direction side of the rear side wall section 23. As illustrated in FIG. 11, the left restraining section 27L and the right restraining section 27R are configured such that, when the airbag 15 is completely inflated, the rear end 27b is disposed close to the head MH1 of the occupant MP1 before the forward movement. Further, the left restraining section 27L and the right restraining section 27R are formed such that the width dimension T1 on the up-down direction side (see FIG. 9) of the portion on the side of the base portion 27a in the flatly deployed state is set to be about ⅔ of the width dimension T2 (see FIG. 9) on the up-down direction side of the region in the vicinity of the center in the left-right direction in the rear side wall section 23, and the width dimension on the up-down direction side upon completion of inflation is set to be slightly smaller than the width dimension on the up-down direction side of the head MH1 of the occupant MP1 (see FIG. 10). Further, a width dimension T3 (see FIG. 9) of the left restraining section 27L and the right restraining section 27R on the front-rear direction side is set to a dimension that the left and right sides of the head MH1 can be covered up to the vicinity of the ears, when receiving the head MH1 of the occupant MP1 at the time of the completion of the inflation of the airbag 15 (see FIG. 10).

Further, in the airbag 15 of the embodiment, in the rear side wall section 23, the lower portion 23a disposed on the lower side of the head receiving section 26 at the time of completion of the inflation of the airbag 15 constitutes an upper half body restraining surface 35 that can receive the upper half body UB1 of the occupant MP1, in the case of the embodiment, the region below the head MH1 (a region from the shoulder to the chest). The occupant protecting section 34 that is disposed on the rear surface side at the time completion of inflation and can protect the occupant MP1 is constituted by the upper half body restraining surface 35, and the head receiving section 26 disposed to partially protrude from the upper side (the upper part 23b) in the rear surface (the rear side wall section 23) of the airbag main body 16. The left inner side wall section 28L and the right inner side wall section 28R, which are disposed so as to face each other on the inner side in the left-right direction, of the left restraining section 27L and the right restraining section 27R constituting the head receiving section 26, constitute the left restraining surface 31L and the right restraining surface 31R that can receive the side surface of the head MH1 of the occupant MP1. That is, in the airbag 15 of the embodiment, the left restraining surface 31L is formed so as to protrude rearward from the upper half body restraining surface 35 (rear side wall section 23) in a region on the left side of the center of the occupant protecting section 34 in the left-right direction, and the right restraining surface 31R is formed so as to protrude rearward from the upper half body restraining surface 35 (rear side wall section 23) in the region on the right side of the center of the occupant protecting section 34 in the left-right direction. The left restraining surface 31L and the right restraining surface 31R are configured to be disposed obliquely with respect to the front-rear direction so as to be expanded toward the rear end 31b side when the inflation of the airbag 15 is completed (see, FIG. 6). Furthermore, in the airbag 15 of the embodiment, the left restraining section 27L and the right restraining section 27R having the substantially plate-like inflation completion shape are configured so that, in a state of viewing the airbag 15 upon completion of inflation from above, the base portion 27a at the time of completion of inflation is positioned on the center side in the left-right direction from the left edge 23c and the right edge 23d of the upper part 23b of the rear side wall section 23. In other words, the airbag 15 is configured to have recessed portions 33L and 33R recessed inward in the left-right direction between the upper part 23b and the rear side wall section 23 in the outer regions in the left-right direction of the left restraining section 27L and the right restraining section 27R (see FIGS. 4 and 6). Further, in the airbag 15 of the embodiment, the left inner side wall section 28L and the right inner side wall section 28R are configured such that the base portions 28a are brought into contact with each other when the inflation is completed. In other words, the left restraining surface 31L and the right restraining surface 31R are configured to bring the base portions 31a into contact with each other when the inflation of the airbag 15 is completed (see FIG. 6). In the airbag 15 according to the embodiment, when the inflation is completed, while the head MH1 of the occupant MP1 is inserted into the recessed portion 32 formed by the tapered region between the left restraining section 27L and the right restraining section 27R in the head receiving section 26, the head MH1 of the occupant MP1 is protected by receiving the head MH1 of the occupant MP1 by the left restraining section 27L or the right restraining section 27R.

Figure 5:
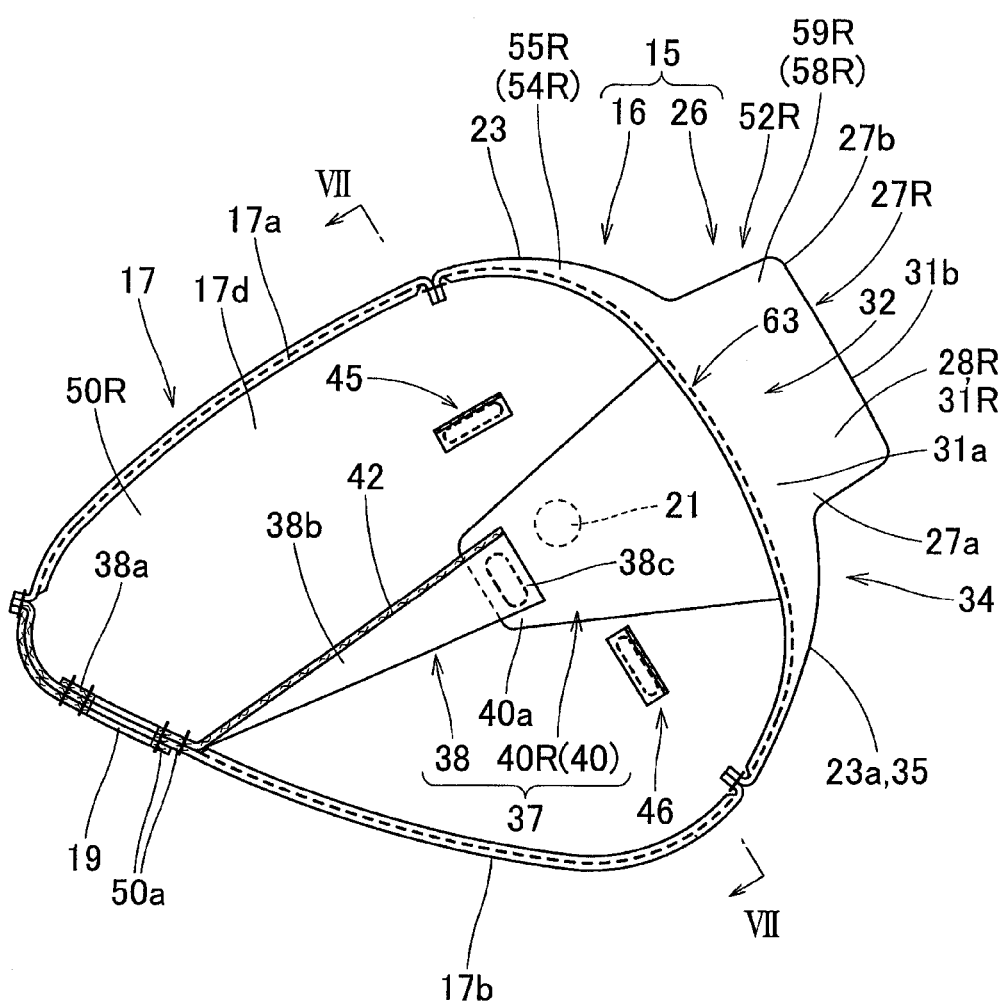
FIG. 5 is a schematic longitudinal sectional view of the airbag illustrated in FIG. 2.
Figure 6:
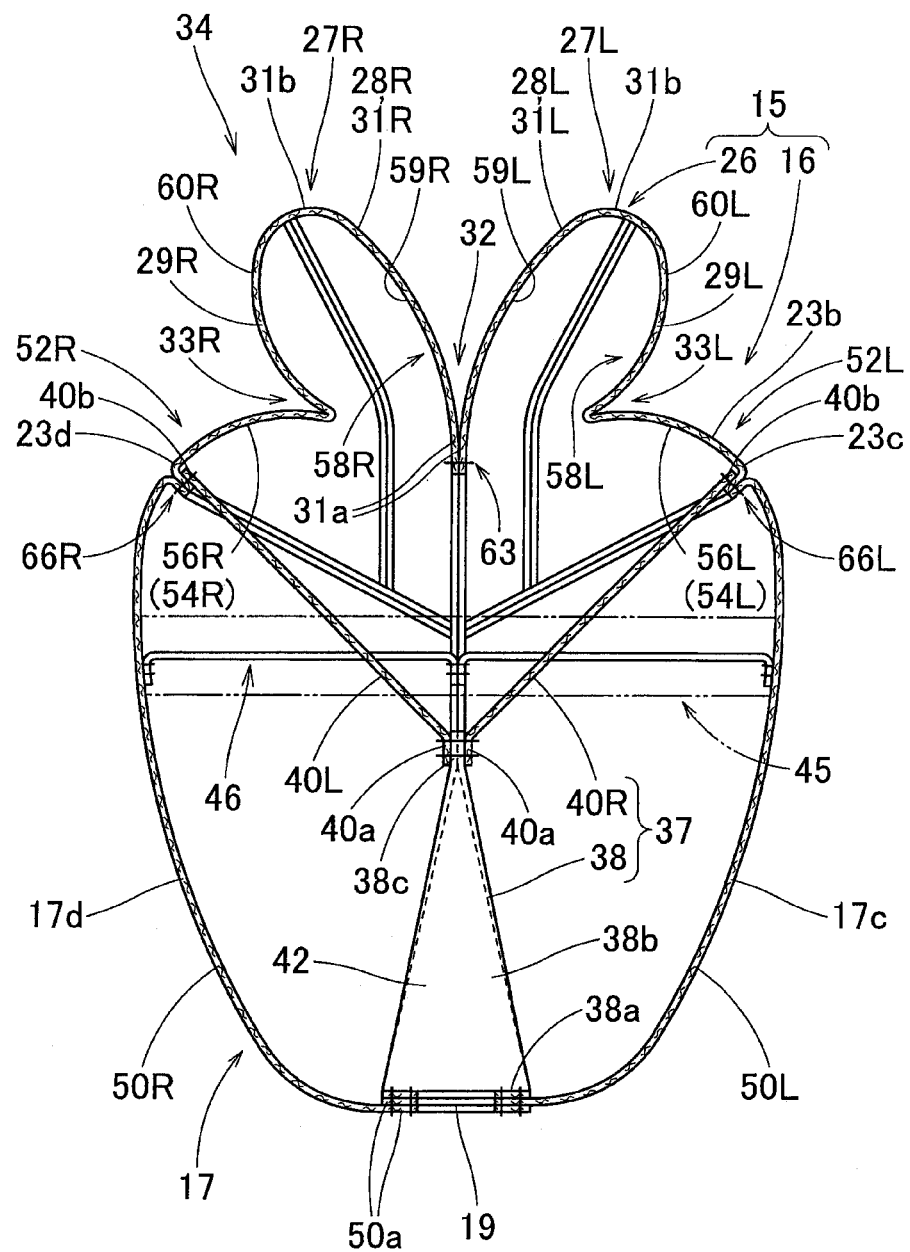
FIG. 6 is a schematic transverse sectional view of the airbag of FIG. 2.
Figure 7:
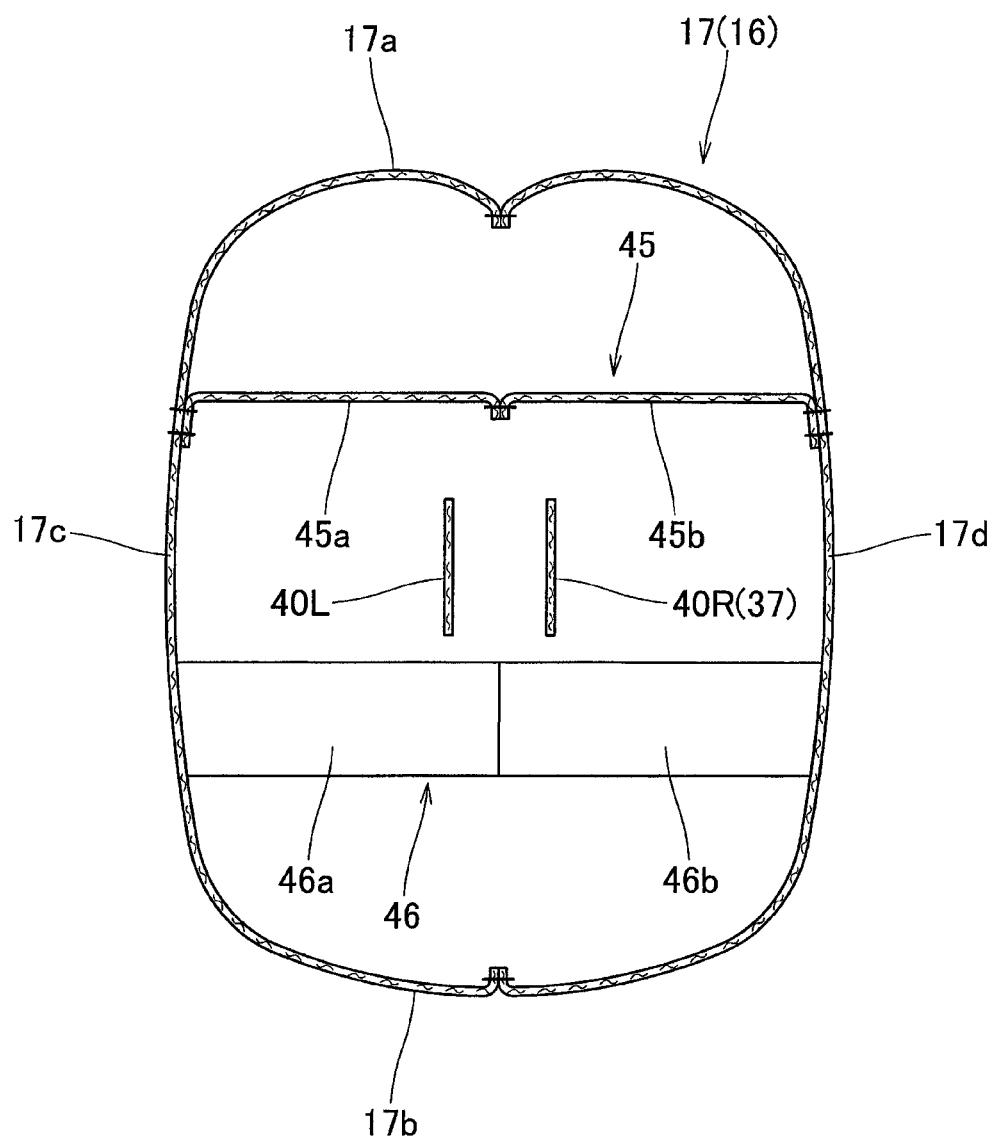
FIG. 7 is a cross-sectional view illustrating a part VII-VII of FIG. 5.

The front and rear tethers 37 disposed in the airbag main body 16 are configured to connect the front side portion 38 extending from the peripheral edge of the gas inflow port 19 and the rear parts 40L and 40R extending from the rear side wall section 23 (see FIGS. 5 to 7).

Figure 8:
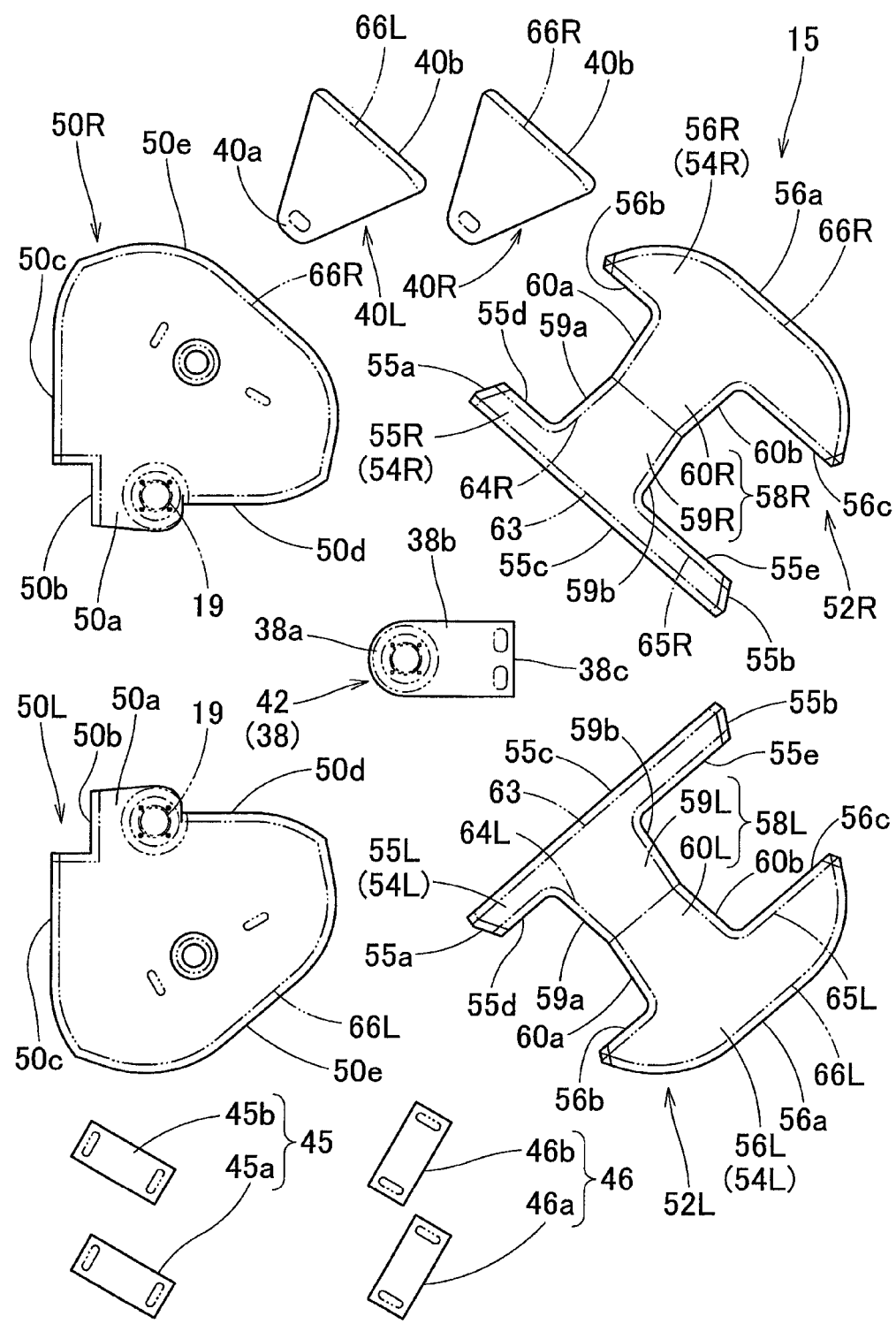
FIG. 8 is a plan view illustrating a base fabric constituting the airbag illustrated in FIG. 2.

The front side portion 38 is disposed to extend from the gas inflow port 19 and is formed by folding the material 42 for the front side portion illustrated in FIG. 8 in the embodiment. As a symmetrical shape, an external shape at the time of completion of inflation of the airbag main body 16 has a three-dimensional shape approximating to a substantially triangular pyramid shape in which the front end side is substantially along the left-right direction and the rear end side is substantially along the up-down direction. In the case of the embodiment, as illustrated in FIGS. 5 and 6, the front side portion 38 serves as a connecting portion 38*a* to the airbag main body 16 in the region of the front end side, an opening (not illustrated) corresponding to the gas inflow port 19 and the mounting hole 20 is disposed in the connecting portion 38*a*, and the connecting portion 38*a* is connected to the lower wall section 17*b* of the peripheral wall section 17 over the entire circumference at the peripheral edge portion of the gas inflow port 19. Further, a region extending rearward from the gas inflow port 19 in the front side portion 38 constitutes the main body portion 38*b*, and the external shape of the main body portion 38*b* is formed into a three-dimensional shape approximating a substantially triangular pyramid shape (see FIGS. 5 and 6). In the main body portion 38*b*, the upper and lower width dimensions of the portion on the side of the rear end 38*c* sewn to the front end 40*a* side of the rear parts 40L and 40R are set to substantially coincide with the upper and lower width dimensions of the portion on the front end 40*a* side in the rear parts 40L and 40R.

The rear parts 40L and 40R are formed into a sheet shape, its external shape is formed into a substantially trapezoidal shape so that the side of the front end 40*a* connected to the front side portion 38 is narrowed, and upward and downward sides are expanded toward the rear end 40*b* side. In the case of the embodiment, two rear parts 40L and 40R are arranged side by side on the left-right direction side, respectively, and the rear end 40*b* side is sewn to the position near the upper and lower centers on the left edge 23*c* side or the right edge 23*d* side of the rear side wall section 23, and the front ends 40*a* and 40*a* are sewn to the rear end 38*c* side of the front side portion 38 (see FIG. 6). In the case of the embodiment, the rear ends 40*b* of the rear parts 40L and 40R are sewn together when sewing the outer edges 56*a* and 56*a* of the outer parts 56L and 56R in the rear left panel 52L and the rear right panel 52R, and the rear edges 50*e* and 50*e* of the front left panel 50L and the front right panel 50R (when forming the sewing parts 66L and 66R), and are connected to the left edge 23*c* side or the right edge 23*d* side of the rear side wall section 23. That is, in the front and rear tethers 37 of the embodiment, the rear parts 40L and 40R are configured as a bifurcated shape that expand toward the rear end 40*b*. The front and rear tethers 37 regulate the separation distance of the rear side wall section 23 from the peripheral edge portion of the gas inflow port 19 when the inflation of the airbag 15 is completed. Specifically, the front and rear tethers 37 is configured to regulate the separation distance from the peripheral edge portion of the gas inflow port 19 on the left edge 23*c* side and the right edge 23*d* side of the rear side wall section 23.

The left and right tethers 45 and 46 are arranged substantially along the left-right direction so as to connect the left wall section 17*c* and the right wall section 17*d* when the inflation of the airbag main body 16 is completed. In the case of the embodiment, as illustrated in FIGS. 5 and 7, the left and right tethers 45 and 46 are disposed in two places of a region above and a region below the front and rear tethers 37.

Each of the left and right tethers 45 and 46 is formed in a belt shape arranged substantially along the left-right direction so as to connect the left wall section 17*c* and the right wall section 17*d*, respectively. In the embodiment, the left and right tether 45 arranged on the upper side of the front and rear tethers 37 is arranged such that the width direction thereof extends along the substantially font-rear direction, and the left and right tether 46 arranged on the lower side of the front and rear tethers 37 is disposed to extend along the substantially up-down direction such that width direction thereof is substantially orthogonal to the left and right tether 45 (see FIGS. 5 and 7). Further, each of the right and left tethers 45 and 46 is formed by coupling two tether base fabrics 45*a*, 45*b*, 46*a*, and 46*b* juxtaposed on the left-right direction side (see FIG. 7). The left and right tethers 45 and 46 is disposed to regulate the separation distance between the left wall section 17*c* and the right wall section 17*d* of the airbag main body 16, thereby suppressing the airbag main body 16 from deploying to largely separate the left wall section 17*c* and the right wall section 17*d* at the initial stage of inflation of the airbag 15.

The airbag main body 16 and the head receiving section 26 are formed in a bag shape by coupling the peripheral edges of the base fabric of a predetermined shape to each other. In the case of the embodiment, as illustrated in FIG. 8, the airbag main body 16 and the head receiving section 26 are made up of four base fabrics of a front left panel 50L and a front right panel 50R disposed on the front side upon completion of inflation, and a rear left panel 52L and a rear right panel 52R disposed on the rear side upon completion of inflation.

The front left panel 50L and the front right panel 50R constitute a region of the peripheral wall section 17 in the airbag body 16 upon completion of inflation as a symmetrical shape, and the region of the peripheral wall section 17 is divided into right and left parts by a dividing plane passing through the center of the gas inflow port 19 and extending along the front-rear direction, except a part serving as a peripheral edge of the gas inflow port 19, whereby the front left panel 50L and the front right panel 50R are separately formed, respectively. In the embodiment, as illustrated in FIG. 8, each of the front left panel 50L and the front right panel 50R has a protruding portion 50*a* constituting the peripheral edge portion of the gas inflow port 19.

The rear left panel 52L and the rear right panel 52R constitute regions of the rear side wall section 23 and the head receiving section 26 in the airbag body 16 at the time of completion of the inflation as a symmetrical shape, and are configured as separate bodies so as to divide the regions into left and right regions. Hereinafter, the rear left panel 52L will be taken as an example and explained in detail. As illustrated in FIG. 8, since the rear right panel 52R is symmetrical with the rear left panel 52L in an external shape, the detailed description thereof will not be provided.

Figure 9:
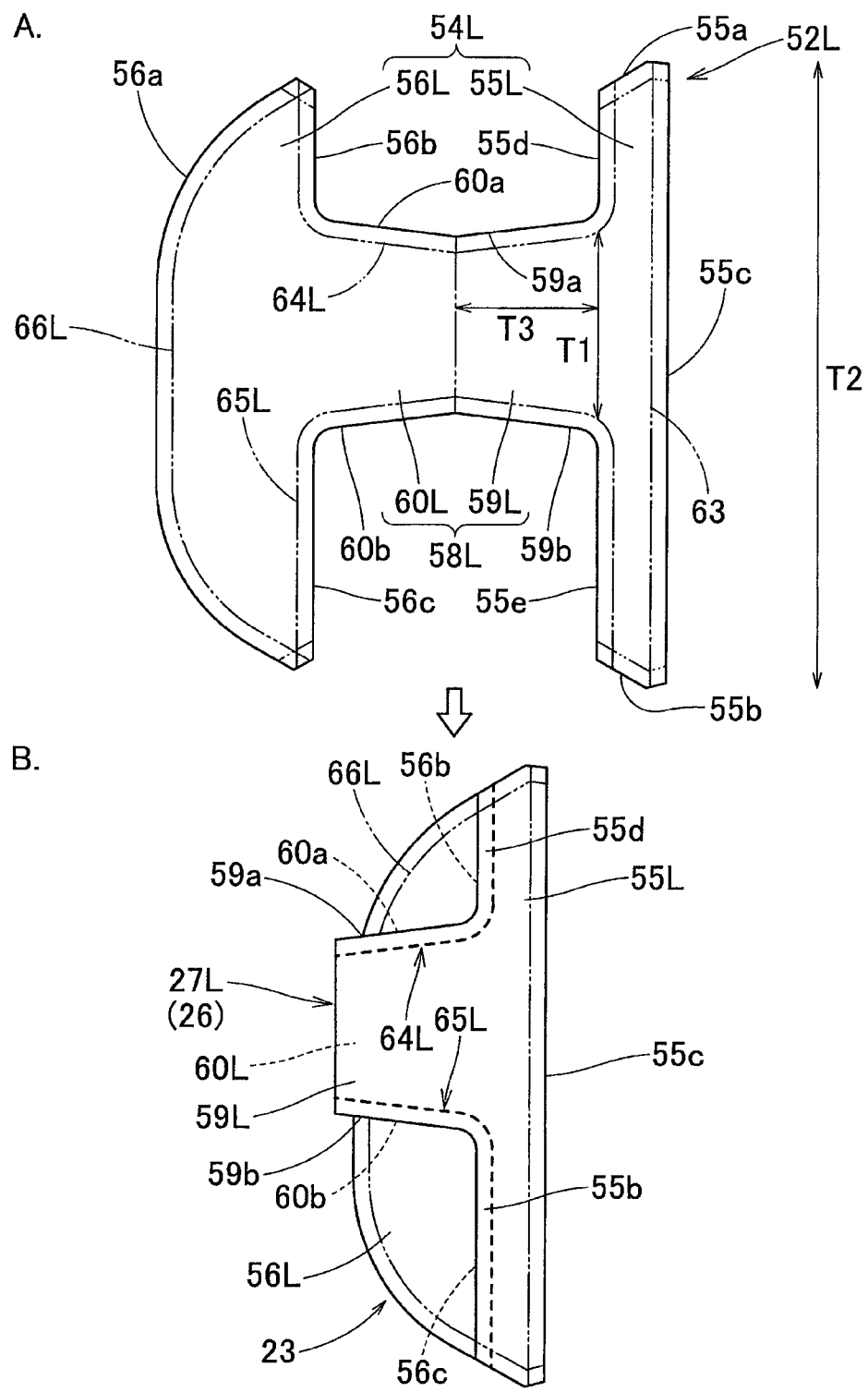
FIG. 9 is a schematic view illustrating a process of coupling predetermined portions of a rear left panel in the airbag of FIG. 2 to form a left region of a rear side wall section and a left restraining section.

As illustrated in Section A of FIG. 9, the rear left panel 52L includes a rear wall part 54L constituting a region on the left side of the center in the left-right direction of the rear side wall section 23, and a restraining section 58L constituting the left restraining section 27L in the head receiving section 26. The rear wall part 54L is divided into an inner part 55L disposed on the center side in the left-right direction and an outer part 56L disposed on the outer side in the left-right direction, on the left-right direction side, and the restraining section 58L is disposed between the inner part 55L and the outer part 56L so that the inner part 55L and the outer part 56L are connected to each other. The width dimension of the inner part 55L in the left-right direction side is set to about ⅓ of the width dimension of the outer part 56L on the left-right direction side. The restraining section 58L is disposed so that the center in the up-down direction is positioned somewhat above the center in the up-down direction of the rear wall part 54L (the inner part 55L and the outer part 56L), has an outer part 60L forming the left outer side wall section 29L, and an inner part 59L constituting the left inner side wall section 28L (the left restraining surface 31L), and the outer part 60L and the inner part 59L are connected to each other on the front end side at the time of the inflation completion. In the embodiment, in the rear left panel 52L, the portion from the upper inner edge 56b of the outer part 56L in the rear wall part 54L to the upper edge 60a of the outer part 60L in the restraining section 58L is sewn using a suture to form the sewing part 64L to the portion from the upper outer edge 55d of the inner part 55L of the rear wall part 54L to the upper edge 59a of the inner part 59L in the restraining section 58L, and the portion from the lower inner edge of the outer part 56L in the rear wall part 54L to the lower edge 60b of the outer part 60 L in the restraining section 58L is sewn using a suture to form a sewing part 65L to the portion from the lower outer edge 55e of the inner part 55L in the rear wall part 54L to the lower edge 59b of the inner part 59L in the restraining section 58L, thereby making it possible to form a region of the left half part of the rear side wall section 23, and the left restraining section 27L projecting from the rear side wall section 23 as illustrated in Section B of FIG. 9.

In the airbag 15 of the embodiment, if the inner edge 55c of the inner part 55R of the rear wall part 54R of the rear right panel 52R in the state in which the right restraining section 27R is formed similarly to the rear left panel 52L, and the inner edge 55c of the inner part 55L of the rear wall part 54L in the rear left panel 52L are sewn together using the suture so as to form the sewing part 63, the head receiving section 26 and the rear side wall section 23 can be formed. In the airbag 15 of the embodiment, when the inflation of the airbag 15 is completed, the left inner side wall section 28L and the right inner side wall section 28R of the left restraining section 27L and the right restraining section 27R of the head receiving section 26 (i.e., the left restraining surface 31L and the right restraining surface 31R) are made up of the inner parts 59L and 59R of the restraining sections 58L and 58R, and the inner parts 55L and 55R of the rear wall parts 54L and 54R continued from the inner parts 59L and 59R, and the base portion 28a (31a) of the left inner side wall section 28L and the right inner side wall section 28R (that is, the left restraining surface 31L and the right restraining surface 31R) are connected to come into contact with each other by a sewing part 63 which sews the inner edges 55c and 55c of the inner parts 55L and 55R (see FIG. 6). That is, as illustrated in FIGS. 3 and 5, in the airbag 15 of the embodiment, in the head receiving section 26, the part (the base portion 31a of the left restraining surface 31L and the right restraining surface 31R) between the left restraining surface 31L and the right restraining surface 31R is constituted to be continuous from the rear side wall section 23 constituting the upper half body restraining surface 35.

In the embodiment, the front left panel 50L, the front right panel 50R, the rear left panel 52L, and the rear right panel 52R constituting the airbag main body 16 and the head receiving section 26, the front part material 42 constituting the front and rear tether 37, and the tether base fabrics 45a, 45b, 46a, and 46b constituting the rear parts 40L and 40R and the right and left tethers 45 and 46 are each formed of a flexible woven fabric made of a polyester yarn, a polyamide yarn or the like.

As illustrated in FIGS. 5 to 8, the airbag main body 16 and the head receiving section 26 of the embodiment have a bag shape, by sewing (coupling) the corresponding edges of a front left panel 50L, a front right panel 50R, a rear left panel 52L and a rear right panel 52R using a suture thread. Specifically, the upper edge 50c and the lower edge 50d of the front left panel 50L are coupled to the upper edge 50c and the lower edge 50d of the front right panel 50R, respectively. The front edges 50b of the front left panel 50L are coupled to overlap each other, and likewise, the front edges 50b of the front right panel 50R are coupled to overlap each other. The rear edge 50e of the front left panel 50L forms the sewing part 66L and is coupled to the outer edge 56a of the outer part 56L of the rear wall part 54L of the rear left panel 52L, the upper edge 55a and the lower edge 55b of the inner part 55L. At the time of forming the sewing part 66L, the rear ends 40b of the rear part 40L of the front and rear tethers 37 are sewn together in the airbag 15 of the embodiment. The rear edge 50e of the front right panel 50R forms a sewing part 66R and is coupled to an outer edge 56a of the outer part 56R of the rear wall part 54R of the rear right panel 52R and upper edge 55a and the lower edge 55b of the inner part 55R. At the time of forming the sewing part 66R, the rear ends 40b of the rear part 40R of the front and rear tethers 37 are jointly sewn.

In the rear left panel 52L, the part from the upper outer edge 55d of the inner part 55L in the rear wall part 54L to the upper edge 59a of the inner part 59L in the restraining section 58L forms a sewing part 64L, and is coupled to the part from the upper inner edge 56b of the outer part 56L in the rear wall part 54L to the upper edge 60a of the outer part 60L in the restraining section 58L. In the rear left panel 52L, the part from the lower outer edge 55e of the inner part 55L in the rear wall part 54L to the lower edge 59b of the inner part 59L in the restraining section 58L forms a sewing part 65L, and is coupled to the part from the lower inner edge 56c of the outer part 56L in the rear wall part 54L to the lower edge 60b of the outer part 60L in the restraining section 58L. Likewise, in the rear right panel 52R, the part from the upper outer edge 55d of the inner part 55R in the rear wall part 54R to the upper edge 59a of the inner part 59R in the restraining section 58R forms a sewing part 64R, and is coupled to the part from the upper inner edge 56b of the outer part 56R in the rear wall part 54R to the upper edge 60a of the outer part 60R in the restraining section 58R. In the rear right panel 52R, the part from the lower outer edge 55e of the inner part 55R in the rear wall part 54R to the lower edge 59b of the inner part 59R in the restraining section 58R forms the sewing part 65R, and is coupled to the part from the lower inner edge 56c of the outer part 56R in the rear wall part 54R to the lower edge 60b of the outer part 60R in the restraining section 58R. The inner edge 55c of the inner part 55L in the rear wall part 54L of the rear left panel 52L forms the sewing part 63, and is coupled to the inner edge 55c of the inner part 55R in the rear wall part 54R of the rear right panel 52R.

Next, mounting of the passenger seat airbag device M1 of the first embodiment on a vehicle will be described. First, in a state in which the airbag 15 is stored inside the retainer 9, the airbag 15 is folded to be storable in the case 12, and the surroundings of the folded airbag 15 are wrapped by a wrapping sheet (not illustrated) which can be broken so as not to collapse. Next, the folded airbag 15 is placed on the bottom wall section 12a of the case 12. The main body portion 8a of the inflator 8 is inserted into the case 12 from the lower side of the bottom wall section 12a, and each bolt 9a protruding downward from the bottom wall section 12a is inserted into the flange section 8c of the inflator 8. Thereafter, when the nut 10 is fastened to each bolt 9a protruding from the flange section 8c of the inflator 8, the folded airbag 15 and the inflator 8 can be mounted to the case 12.

Further, by fastening the peripheral wall section 12b of the case 12 to the connecting wall section 6c of the airbag cover 6 in the instrument panel 1 mounted on the vehicle and fixing a bracket (not illustrated) of the case 12 to the body side of the vehicle, the passenger seat airbag device M1 can be mounted on the vehicle.

In the passenger seat airbag device M1 of the first embodiment, in a state of being mounted on the vehicle, if the inflation gas is discharged from the gas discharge port 8b of the inflator 8 at the time of a frontal collision, an oblique collision, or an offset collision of the vehicle, the airbag 15 is inflated by flowing of the inflation gas therein, thereby pushing the doors 6a and 6b of the airbag cover 6 to be opened. The airbag 15 projects upward from the case 12 via an opening formed by pushing and opening the doors 6a and 6b of the airbag cover 6 and is deployed and inflated, while protruding toward the rear side of the vehicle. The inflation is completed to block the space between the upper surface 2 of the instrument panel 1 and the windshield 4 above the instrument panel 1 as indicated by the two-dot chain line in FIG. 1, and as illustrated in FIGS. 10 and 11.

In the passenger seat airbag device M1 of the first embodiment, when the inflation of the airbag 15 is completed, the head receiving section 26 that receives the head MH1 of the occupant MP1 is formed to protrude rearward from the upper half body restraining surface 35, and the head receiving section 26 is configured to receive the left and right side surfaces of the head MH1 by the left restraining surface 31L and the right restraining surface 31R covering the left and right sides of the head MH1 of the occupant MP1. That is, in the passenger seat airbag device M1 of the first embodiment, when the airbag 15 is completely inflated, the head receiving section 26 protrudes toward the occupant MP1 on the rear side from the upper half body restraining surface 35 as illustrated in FIG. 10. In other words, the separation distance between the head receiving section 26 and the head MH1 of the occupant MP1 seated on the passenger seat can be set to be relatively small. Therefore, the head MH1 of the occupant MP1 moving obliquely forward at the time of the oblique collision or the offset collision of the vehicle can be quickly and accurately received by the left restraining surface 31L or the right restraining surface 31R of the head receiving section 26. Further, in the passenger seat airbag device M1 of the first embodiment, since the head receiving section 26 is formed so as to protrude rearward from the upper half body restraining surface 35 when the inflation of the airbag 15 is completed, it is possible to suppress an increase in the volume, as compared with the conventional airbag in which the recessed portion and the protruding portion are formed over the entire upper and lower regions. Furthermore, in the passenger seat airbag device M1 of the first embodiment, in the airbag 15 that is completely inflated, the upper half body restraining surface 35 is disposed at a position on the front side relative to the head receiving section 26 and does not include the large irregularities. Thus, the upper half body UB1 (specifically, the region below the head MH1) of the occupant MP1 moving forward is widely and accurately received by the upper half body restraining surface 35 when the inflation of the airbag 15 is completed.

Therefore, in the passenger seat airbag device M1 of the first embodiment, the head MH1 of the occupant MP1 moving obliquely forward can be protected smoothly by the completely inflated airbag 15.

In the passenger seat airbag device M1 of the first embodiment, the left restraining surface 31L and the right restraining surface 31R in the head receiving section 26 are respectively located on the left region and the right region of the center in the left-right direction of the occupant protecting section 34. Further, the head receiving section 26 is configured so that the part between the left restraining surface 31L and the right restraining surface 31R is continued from the upper half body restraining surface 35. In other words, since the head receiving section 26 is not formed to be recessed from the upper half body restraining surface 35, even when the vehicle is in a frontal collision, the head MH1 of the occupant MP1 moving forward is made to enter the gap (the part of the recessed portion 32) between the left restraining surface 31L and the right restraining surface 31R as illustrated by the two-dot chain line in FIG. 10, so that the head can be accurately protected without any trouble.

Figure 12:
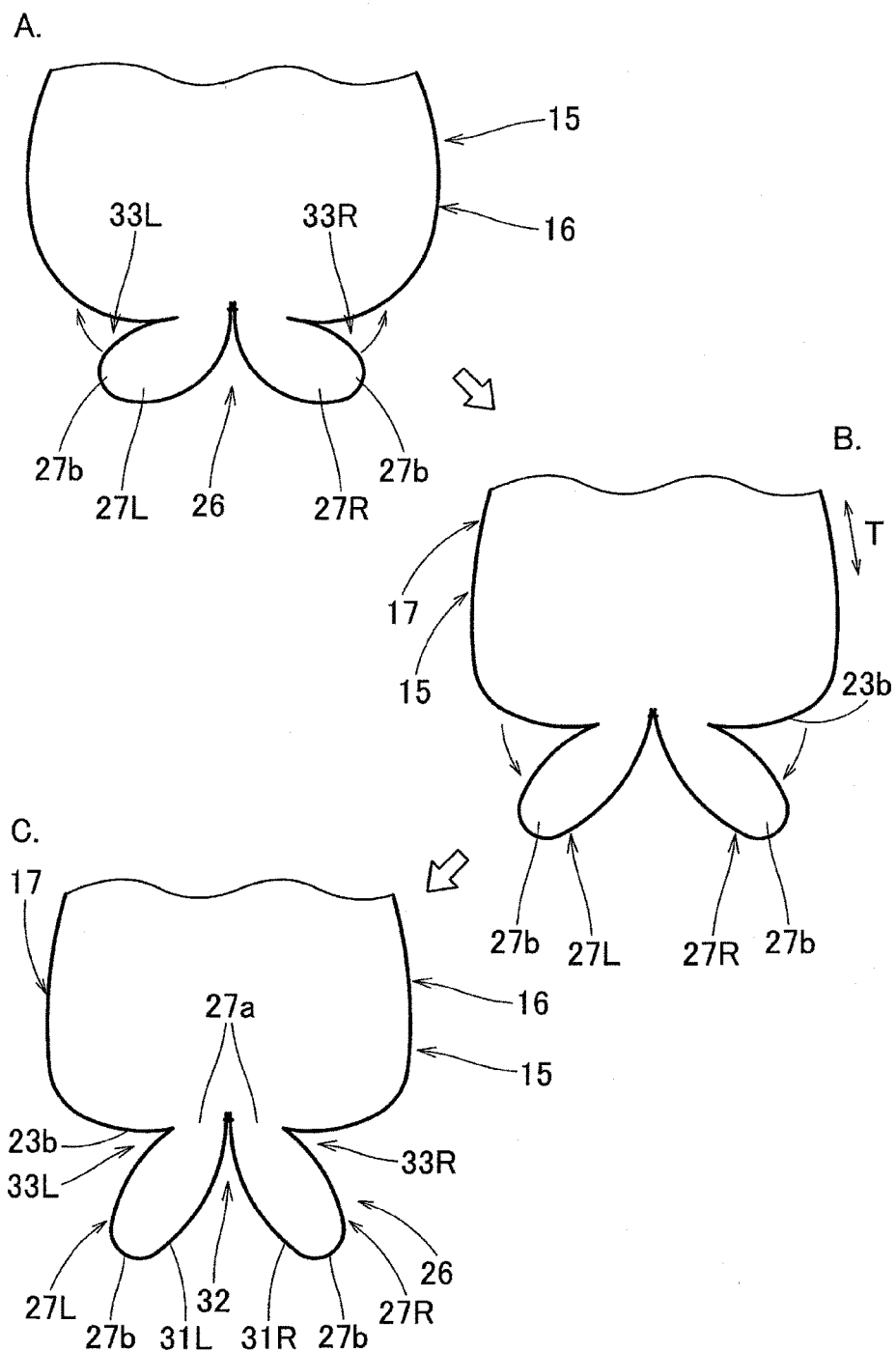
FIG. 12 is a schematic view illustrating an inflation process of the airbag in the passenger seat airbag device of the first embodiment.

Furthermore, in the passenger seat airbag device M1 of the first embodiment, the airbag 15 is configured to include the airbag main body 16 having the lower side (lower side part 23a) of the rear surface (rear side wall section 23) upon completion of inflation as the upper half body restraining surface 35, and the head receiving section 26 which partially protrudes from the upper side (upper part 23b) of the rear surface (rear side wall section 23) of the airbag main body 16 upon completion of inflation. The head receiving section 26 is configured to include a left restraining section 27L having a left restraining surface 31L, and a right restraining section 27R having a right restraining surface 31R. The left restraining section 27L and the right restraining section 27R are formed such that the side of the base portion 27a upon completion of the inflation is positioned on the center side in the left-right direction with respect to the left edge 23c and the right edge 23d in the upper part 23b of the rear side wall section 23 to protrude rearward from the rear side wall section 23 in the state in which the completely inflated airbag 15 is viewed from above. That is, in the passenger seat airbag device M1 of the first embodiment, in the left-right direction outer regions of the left restraining section 27L and the right restraining section 27R, recessed portions 33L and 33R are formed so as to be recessed inward in the left-right direction between the rear wall section 23 and the upper part 23b (see FIG. 11). Therefore, in the passenger seat airbag device M1 of the first embodiment, when the airbag 15 is deployed and inflated, as illustrated in Section A of FIG. 12, after the left restraining section 27L and the right restraining section 27R are temporarily deployed so that the rear end 27b faces outward on the right and left sides and, as illustrated in Sections B and C of FIG. 12, with the tension T generated on the outer surface of the airbag 15, the left and right restraining sections 27L and 27R are inflated so that the rear ends 27b approach each other. As a result, the head MH1 of the occupant MP1 can be smoothly interposed between the left and right restraining sections 27L and 27R from both the left and right sides, and the head MH1 of the occupant MP1 can be smoothly restrained. If this point is not taken into consideration, the base portions of the left restraining section and the right restraining section may not be positioned at the center side in the left-right direction with respect to the left and right edges in the rear surface of the airbag main body when the inflation is completed. Further, a configuration in which the wall sections disposed on the outer side in the left-right direction upon completion of the inflation are formed to be continued from the left wall section and the right wall section of the airbag main body may be adopted.

Figure 13:
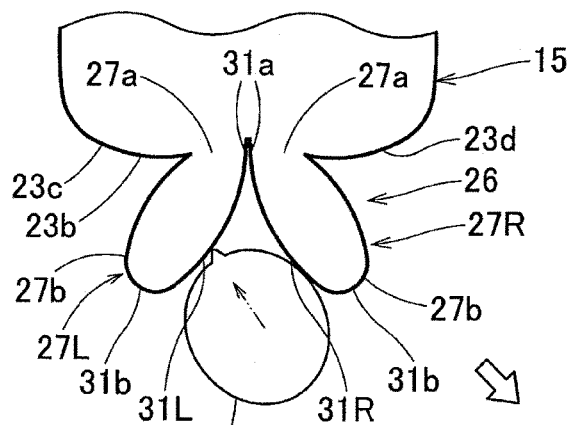
FIG. 13 is a schematic view illustrating a process of receiving a head of an occupant moving obliquely forward in the completely inflated airbag in the passenger seat airbag device of the first embodiment.
Figure 13:
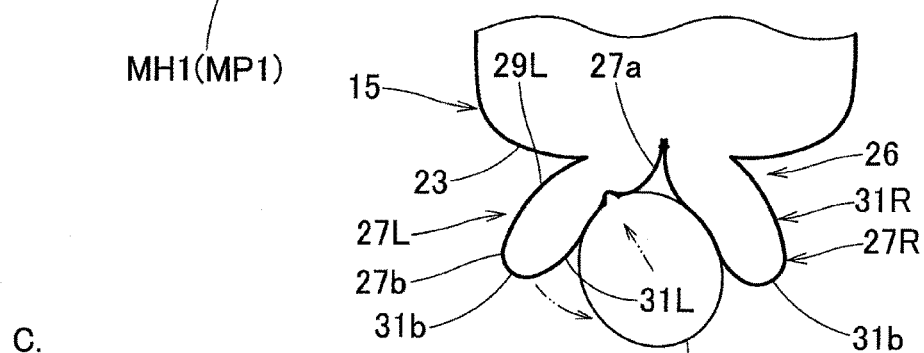
Figure 13:
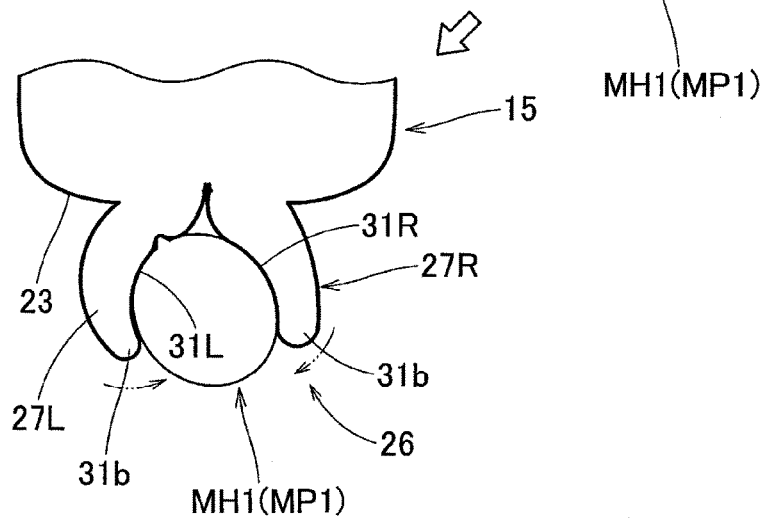

Furthermore, in the passenger seat airbag device M1 of the first embodiment, the left restraining surface 31L and the right restraining surface 31R are configured to be disposed to incline to the front-rear direction so as to be expanded toward the rear end 31b when the inflation of the airbag 15 is completed. That is, in the passenger seat airbag device M1 of the first embodiment, the left restraining surface 31L or the right restraining surface 31R is disposed so as to face the head MH1 of the occupant MP1 that moves obliquely forward. Thus, as compared to the case where the left restraining surface and the right restraining surface are arranged to extend substantially along the front-rear direction upon completion of the inflation of the airbag, the head MH1 of the occupant MP1 moving obliquely forward can be precisely restrained on a wide surface by the left restraining surface 31L or the right restraining surface 31R. Further, in the passenger seat airbag device M1 of the first embodiment, when the left restraining surface 31L or the right restraining surface 31R comes into contact with the head MH1 of the occupant MP1 upon completion of inflation of the airbag 15, the left restraining section 27L or the right restraining section 27R in contact with the head MH1 of the occupant MP1 rotates and moves so that the rear end 27b faces the other left restraining section 27L or the right restraining section 27R, and it is possible to more smoothly interpose the head MH1 of the occupant MP1 by the left restraining section 27L and the right restraining section 27R. Specifically, as illustrated in Sections A and B of FIG. 13, when the head MH1 of the occupant MP1 moving toward the left diagonally forward side comes into contact with the region in the vicinity of the base portion 27a of the left restraining section 27L, the left restraining surface 31L (the left inner side wall section 28L) for bringing the head MH1 of the occupant MP1 into contact therewith receives the head MH1 and is recessed toward the front side (the left outer side wall section 29L side), and the entire left restraining section 27L is pressed against the head MH1 of the occupant MP1. Thus, as illustrated in Section C of FIG. 13, the rear end 27b is bent to face the right restraining section 27R side so that the head MH1 of the occupant MP1 can be sandwiched by the left restraining section 27L and the right restraining section 27R. Further, unless such a point is taken into consideration, the left restraining surface and the right restraining surface may be disposed so as to substantially extend along the front-rear direction.

Furthermore, in the passenger seat airbag device M1 of the first embodiment, since the left restraining surface 31L and the right restraining surface 31R are configured such that the base portions 31a are brought into contact with each other when the inflation of the airbag 15 is completed, the head MH1 of the occupant MP1 is received by both of the left restraining surface 31L and the right restraining surface 31R when receiving the head MH1 of the occupant MP1 by the head receiving section 26. Thus, the head MH1 of the occupant MP1 can be restrained more smoothly by the left restraining surface 31 L and the right restraining surface 31R. It is to be noted that, unless such a point is taken into consideration, the base portions of the left restraining surface and the right restraining surface may be arranged so as to be spaced apart from each other on the left-right direction side when the inflation of the airbag is completed.

Figure 14:
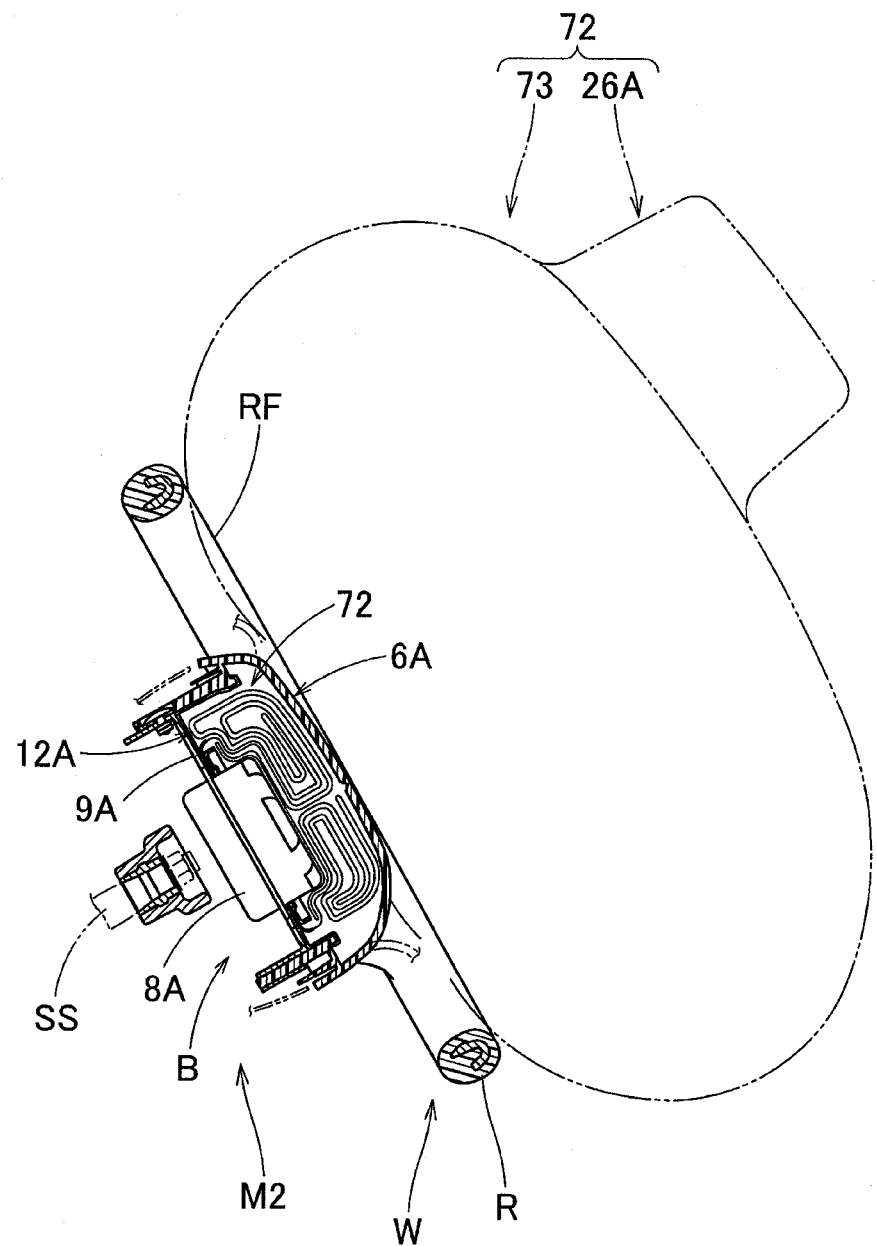
FIG. 14 is a schematic longitudinal sectional view of a state in which a steering wheel airbag device according to a second embodiment of the present invention is mounted on a vehicle.

Next, as a second embodiment, a description will be given of a steering wheel airbag device M2 disposed in front of a driver's seat. As illustrated in FIG. 14, the steering wheel airbag device M2 of the second embodiment is disposed at a part of the boss portion B in the steering wheel W in front of the driver MP2 seated on a driver's seat (not illustrated), and includes a folded airbag 72, an inflator 8A for supplying an inflation gas to the airbag 72, a case 12A as a storage part which is disposed at a part of the boss portion B to store and hold the airbag 72 and the inflator 8A, a retainer 9A for mounting the airbag 72 and the inflator 8A to the case 12A, and an airbag cover 6A covering the folded airbag 72. Further, in the steering wheel airbag device M2 of the second embodiment, although the mounting positions are different, since the same members as those used for the aforementioned passenger seat airbag device M1 are used, members other than the airbag 72 are denoted by adding "A" at the end of the same reference numeral, and a detailed description thereof will not be provided. In the second embodiment, front-rear, up-down, and left-right directions are based on straight-ahead steering of the steering wheel W mounted on the vehicle unless otherwise stated. The front-rear, up-down, and left-right directions are illustrated such that an up-down direction along the axial direction of a steering shaft SS (see tow-dot chain lines in FIG. 14) for assembling the steering wheel W is defined as the up-down direction, a front-rear direction of the vehicle which is the direction orthogonal to the axis of the steering shaft SS is defined as the front-rear direction, and a left-right direction of the vehicle which is in the direction orthogonal to the axis of the steering shaft SS is defined as a left-right direction.

Figure 15:
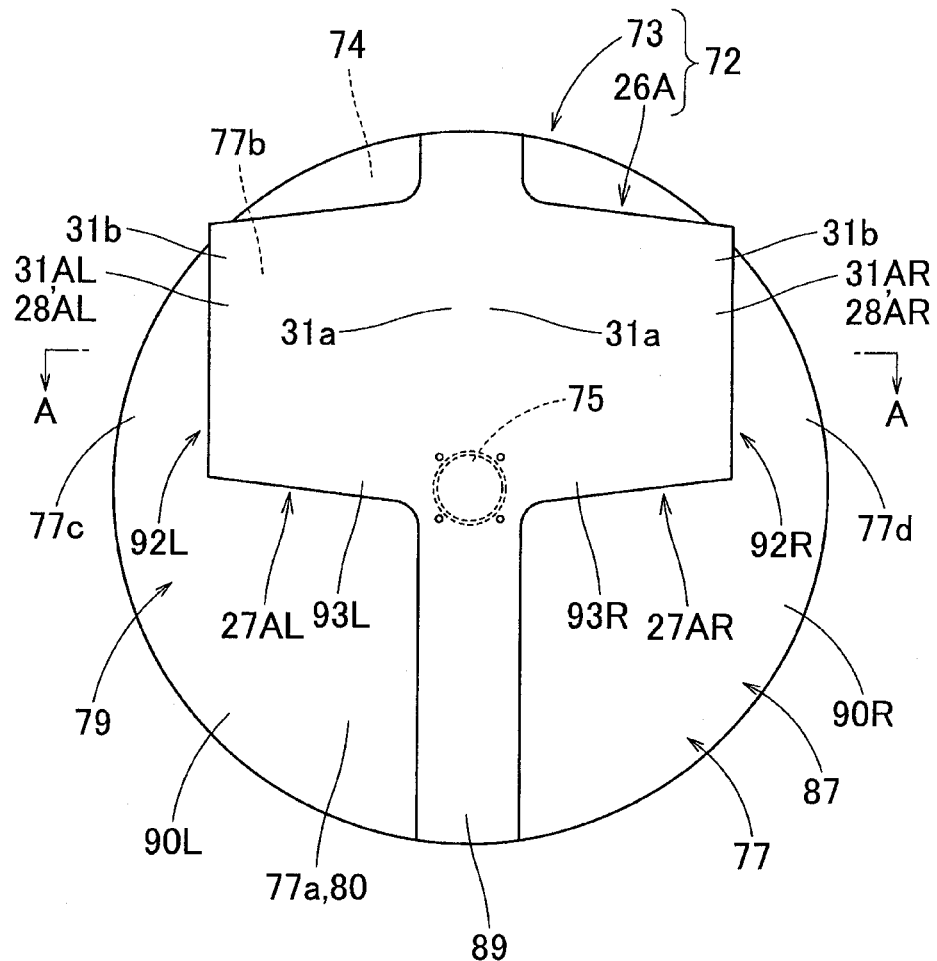
FIG. 15 is a plan view of a state in which the airbag used in the steering wheel airbag device of the second embodiment is flatly deployed.
Figure 15:
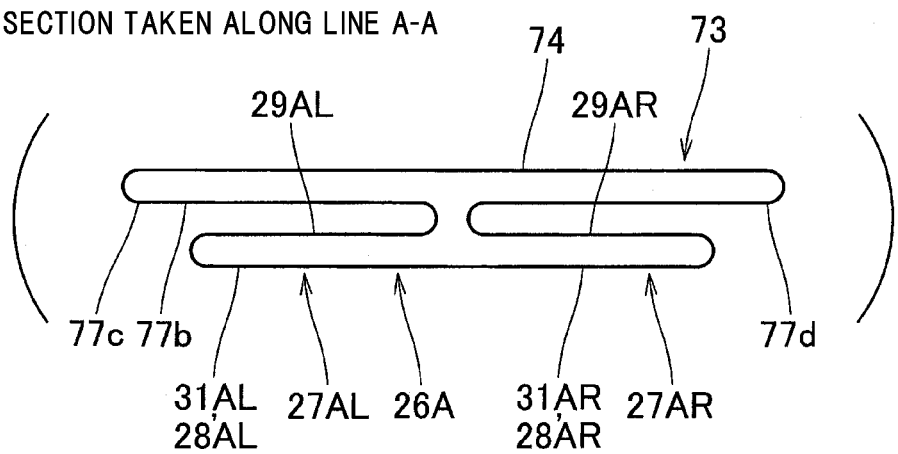

As illustrated in FIG. 15, the airbag 72 includes an airbag main body 73, and a head receiving section 26A which partially protrudes from the airbag main body 73 when the inflation is completed.

Figure 18:
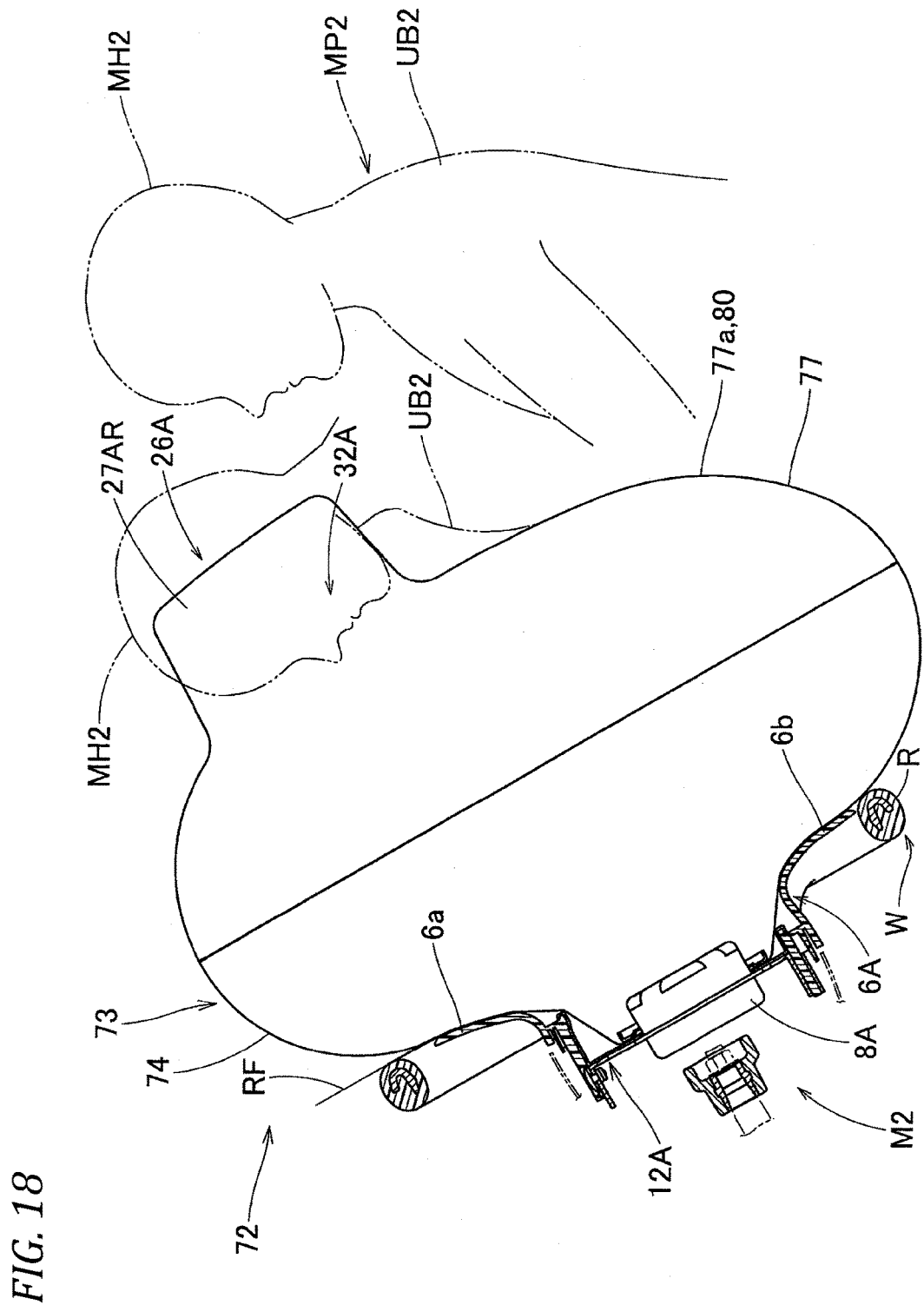
FIG. 18 is a schematic longitudinal sectional view illustrating a state in which the airbag is completely inflated in the steering wheel airbag device of the second embodiment.
Figure 19:
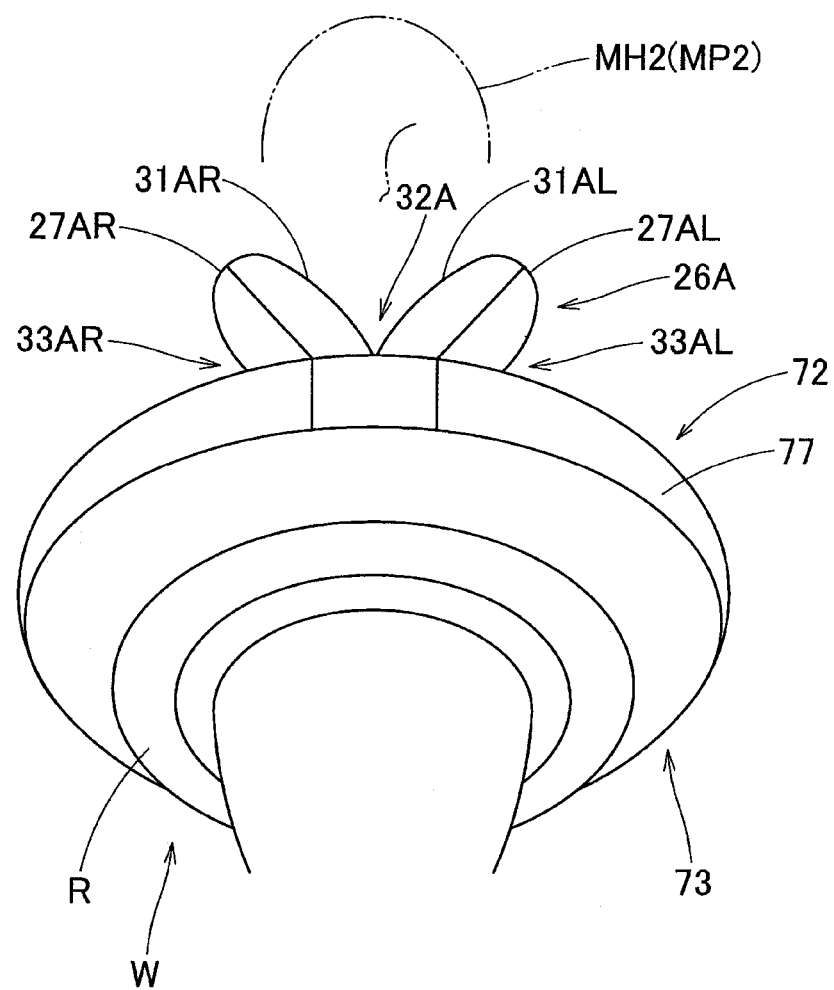
FIG. 19 is a schematic front view illustrating a state in which the airbag is completely inflated in the steering wheel airbag device of the second embodiment.

As illustrated in FIGS. 18 and 19, the airbag main body 73 has an inflation completion shape of a substantially convex lens shape having a substantially circular outer peripheral edge which can cover the upper surface side of the steering wheel W substantially over the entire surface, and in which the thickness near the center is made thicker and the thickness is made thinner toward the outer peripheral edge side. The airbag main body 73 is configured to include an occupant side wall section 77 disposed on the occupant (driver MP2) side upon completion of inflation, and a vehicle body side wall section 74 disposed on the side of the steering wheel W upon completion of inflation, which have a substantially circular shape having the same external shape. More specifically, the airbag main body 73 is configured so that the outer diameter dimension upon completion of inflation is set larger than the outer diameter dimension of the ring portion R of the steering wheel W to widely cover the entire upper surface of the ring portion R. In the substantially center of the vehicle body side wall section 74, a gas inflow port 75 for causing the inflation gas discharged from the gas discharge port 8b of the inflator 8A to flow into the airbag main body 73, by inserting the main body portion 8a of the inflator 8A from below is formed in a circular opening (see FIGS. 15 and 16). Four mounting holes (not illustrated) for inserting bolts formed in the retainer 9A are formed on the peripheral edge of the gas inflow port 75 in the vehicle body side wall section 74.

When the inflation of the airbag main body 73 is completed, the occupant side wall section 77 is configured to be disposed substantially along the ring surface RF of the steering wheel W (that is, substantially along the front-rear direction) so as to incline with respect to the upper half body UB2 of the driver (occupant) MP 2 seated on the driver's seat (see FIGS. 14 and 18).

The head receiving section 26A of the airbag 72 of the second embodiment has the same configuration as the head receiving section 26 disposed in the airbag 15 of the aforementioned first embodiment. The symbol 'A' is added to the end of the same reference numeral, and a detailed description thereof will not be provided. As illustrated in FIGS. 18 and 19, the head receiving section 26A protrudes upward (rearward and upward) from the region (front side portion 77b) on the front side of the occupant side wall section 77 in the airbag main body 73 upon completion of inflation. Thus, when the airbag 72 is completely inflated, the head receiving section 26A is formed to protrude upward from a position on the front side relative to the center in the front-rear direction at the approximate center in the left-right direction of the occupant side wall section 77. Specifically, in the airbag 72 of the second embodiment, as illustrated in FIG. 15, the head receiving section 26A is disposed such that the rear end thereof is made to substantially coincide with the center in the front-rear direction of the occupant side wall section 77 (the airbag main body 73), and is arranged in the front half region of the airbag main body 73.

Also, in the airbag 72 of the second embodiment, at the occupant side wall section 77, when the inflation of the airbag 72 is completed, the rear part 77a disposed on the rear side of the head receiving section 26A (the rear lower side when mounted on the vehicle) constitutes an upper half body restraining surface 80 capable of receiving the upper half body UB2 of the driver MP2 as an occupant, more specifically, the region below the head MH2 (the region from the shoulder to the chest), and the occupant protecting section 79 which is disposed on the rear surface side (the upper surface side, in the case of the embodiment) when the inflation of the airbag 72 is completed and is capable of protecting the driver MP2 is constituted by the upper half body restraining surface 80 and the head receiving section 26A. The left inner side wall section 28AL and the right inner side wall section 28AR disposed to face each other on the inner side in the left-right direction in the left restraining section 27AL and the right restraining section 27AR constituting the head receiving section 26A constitute the left restraining surface 31AL and the right restraining surface 31AR capable of receiving the side surface of the head MH2 of the driver MP2. That is, also in the airbag 72 of the second embodiment, the left restraining surface 31AL is formed so as to protrude rearward from the upper half body restraining surface 80 (the occupant side wall section 77) in the region on the left side of the center in the left-right direction of the occupant protecting section 79. And the right restraining surface 31AR is formed so as to protrude rearward from the upper half body restraining surface 80 (the occupant side wall section 77) in the region on the right side of the center of the occupant protecting section 79 in the right-left direction. The left restraining surface 31AL and the right restraining surface 31AR are arranged to be inclined with respect to the front-rear direction so as to be expanded toward the rear end 31b when the inflation of the airbag 72 is completed. Furthermore, even in the airbag 72 of the second embodiment, the left restraining section 27AL and the right restraining section 27AR having the substantially plate-like inflation completion shape, in a state where the airbag 72 upon completion of the inflation is viewed from above, the base portion 27a upon completion of the inflation is positioned on the center side in the left-right direction with respect to the left edge 77c and the right edge 77d of the front side portion 77b of the occupant side wall section 77. In other words, the airbag 72 is configured to have recessed portions 33AL and 33AR recessed inward in the left-right direction between the front side portion 77b and the occupant side wall section 77 in the outer regions in the left-right direction of the left restraining section 27AL and the right restraining section 27AR (see FIG. 19). Even in the airbag 72 of the second embodiment, the left inner side wall section 28AL and the right inner side wall section 28AR are configured such that the base portion 28a is brought into contact with each other when the inflation is completed. In other words, the left restraining surface 31AL and the right restraining surface 31AR are configured so that the base portion 31a is brought into contact with each other when the inflation of the airbag 72 is completed. In the airbag 72 according to the second embodiment, when the inflation is completed, while the head MH2 of the driver MP2 is made to enter the recessed portion 32A formed by the tapered region between the left restraining section 27AL and the right restraining section 27AR in the head receiving section 26A, the head MH2 of the driver MP2 is received by receiving the head MH2 of the driver MP2 by the left restraining section 27AL or the right restraining section 27AR, thereby protecting the head MH2 of the driver MP2.

Figure 16:
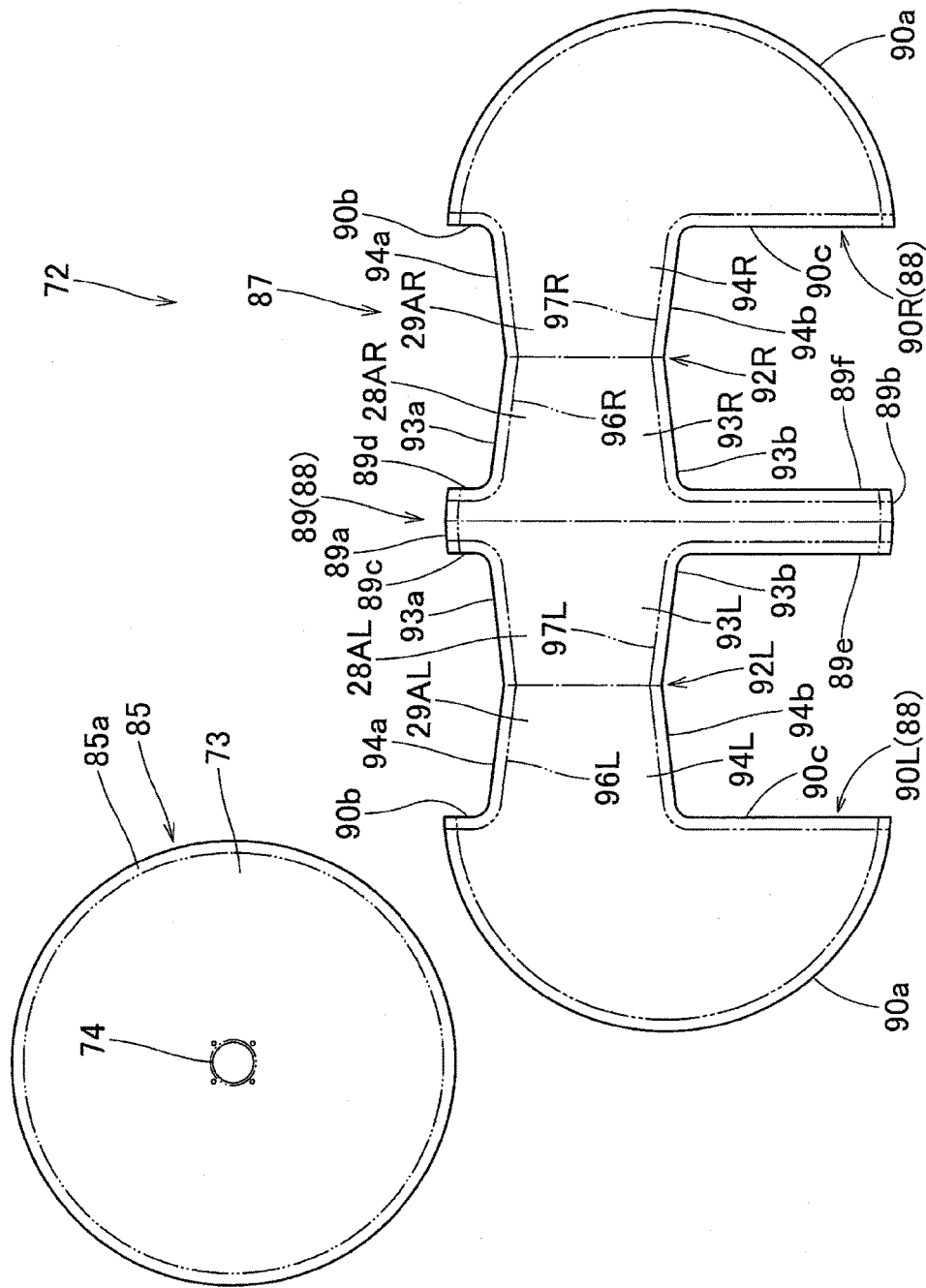
FIG. 16 is a plan view illustrating a base fabric constituting the airbag illustrated in FIG. 15.

The airbag 72 of the second embodiment is formed in a bag shape by coupling the peripheral edges of the base fabrics of a predetermined shape to each other. In the case of the embodiment, as illustrated in FIG. 16, the airbag 72 is configured to include two base fabrics of a vehicle body side wall panel 85 forming the vehicle body side wall section 74, and an upper side panel 87 constituting the occupant side wall section 77 and the head receiving section 26A. The vehicle body side wall panel 85 and the upper side panel 87 are formed of a flexible woven fabric made of a polyester yarn, a polyamide yarn or the like similarly to the aforementioned airbag 15.

The vehicle body side wall panel 85 constitutes a part of the vehicle body side wall section 74 of the airbag main body 73 at the time of completion of the inflation, and its external shape is substantially circular.

The upper panel 87 constitutes a region of the occupant side wall section 77 of the airbag main body 73, and the head receiving section 26A at the time of completion of the inflation. As illustrated in FIG. 16, the upper panel 87 is configured to include an occupant side wall part 88 forming the occupant side wall section 77, a left restraining part 92L constituting the left restraining section 27AL of the head receiving section 26A, and a right restraining part 92R constituting the right restraining section 27AR. In detail, the upper panel 87 divides the occupant side wall part 88 in the left-right direction into three parts of a central part 89 disposed on the center side in the left-right direction, a left part 90L and a right part 90R disposed on the outer sides in the left-right direction. The left restraining section 92L is disposed to connect the left part 90L and the central part 89 between the left part 90L and the central part 89, and the right restraining section 92R is disposed to connect the central part 89 and the right part 90R between the central part 89 and the right part 90R. The left part 90L and the right part 90R in the occupant side wall section 88 are configured as a substantially semicircular shape, and the central part 89 is configured in a substantially belt shape. The left restraining section 92L and the right restraining section 92R are disposed in a region of about the front half of the upper panel 87. The left restraining section 92L and the right restraining section 92R have outer parts 94L and 94R constituting the left outer side wall section 29AL and the right outer side wall section 29AR, and the inner parts 93L and 93R constituting the left inner side wall section 28AL (the left restraining surface 31AL) and the right inner side wall section 28AR (the right restraining surface 31AR). The outer parts 94L and 94R and the inner parts 93L and 93R are connected at the front end side upon completion of inflation, respectively. In the case of the embodiment, the upper panel 87 is configured as a substantially symmetrical shape in a flatly deployed state.

Figure 17:
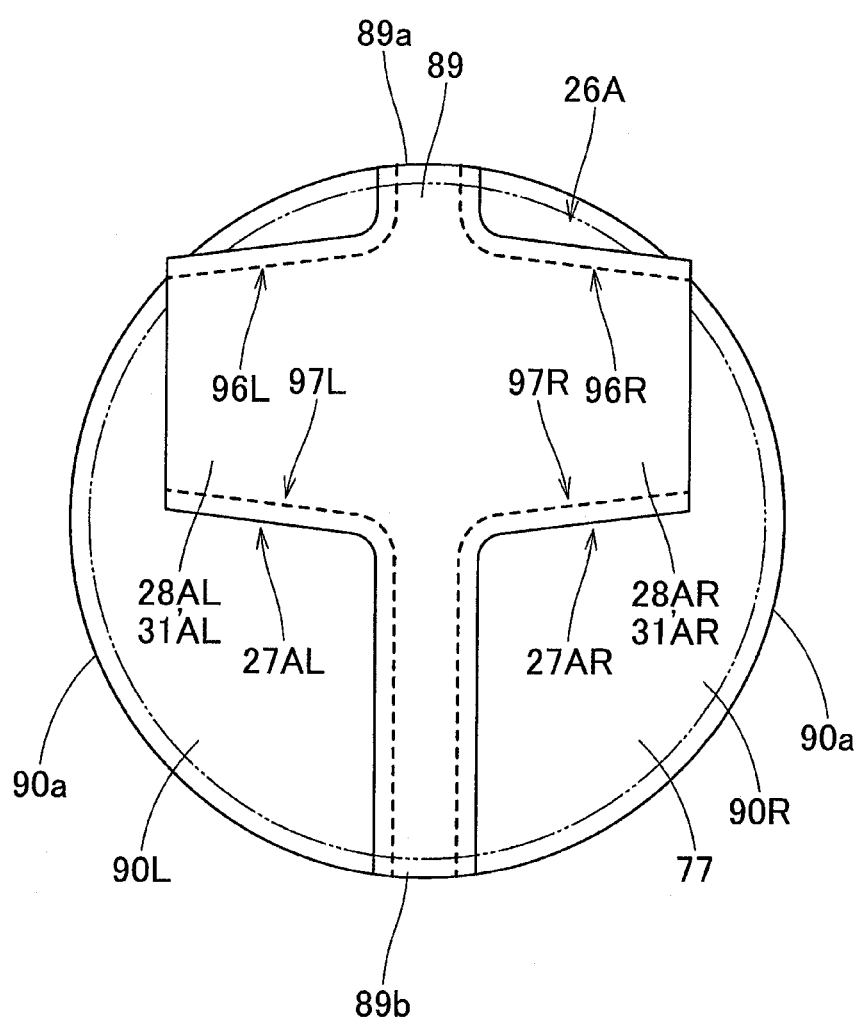
FIG. 17 is a schematic view illustrating a process of coupling predetermined portions of an upper panel in the airbag illustrated in FIG. 15 to form a occupant side wall section and a head receiving section.

Further, in the embodiment, as illustrated in FIG. 17, the upper panel 87 is sewn (coupled) at a predetermined position as described below, thereby forming the occupant side wall section 77 and the head receiving section 26A protruding from the occupant side wall section 77. The part from the front inner edge 90*b* of the left part 90L in the occupant side wall section 88 to the front edge 94*a* of the outer part 94L in the left restraining section 92L is sewn using a suture so as to form a sewing part 96L to the part from the front left edge 89*c* of the central part 89 in the occupant side wall section 88 to the front edge 93*a* of the inner part 93L in the left restraining section 92L. Similarly, the part from the front inner edge 90*b* of the right part 90R of the occupant side wall section 88 to the front edge 94*a* of the outer part 94R of the right restraining section 92R is sewn using a suture so as to form a sewing part 96R, to the part from the front right edge 89*d* of the central part 89 of the occupant side wall section 88 to the front edge 93*a* of the inner part 93R in the right restraining section 92R. The part from the rear inner edge 90*c* of the left part 90L in the occupant side wall section 88 to the rear edge 94*b* of the outer part 94L in the left restraining section 92L is sewn using a suture so as to form a sewing part 97L to the part from the rear left edge 89*e* of the central part 89 in the occupant side wall section 88 to the rear edge 93*b* of the inner part 93L in the left restraining section 92L. Similarly, the part from the rear inner edge 90*c* of the right part 90R in the occupant side wall section 88 to the rear edge 94*b* of the outer part 94R in the right restraining section 92R is sewn using the suture so as to form the sewing part 97R to the part from the rear right edge 89*f* of the central part 89 in the occupant side wall section 88 to the rear edge 93*b* of the inner part 93R in the right restraining section 92R.

In the airbag 72 of the second embodiment, as illustrated in FIG. 17, the occupant side wall section 88 (the left part 90L, the right side portion 90R, and the central part 89) in the state in which the head receiving section 26A is formed has a substantially circular external shape made to substantially coincide with the vehicle body side wall panel 85. When the outer edge 90*a* of the left part 90L and the right part 90R of the occupant side wall section 88, and the front edge 89*a* and the rear edge 89*b* of the central part 89 are sewn to the outer peripheral edge 85*a* of the vehicle body side wall panel 85 using a suture, a bag-shaped airbag 72 can be manufactured.

Even in the steering wheel airbag device M2 using the airbag 72 of the second embodiment, the head receiving section 26A for receiving the head MH2 of the driver MP2 upon completion of the inflation of the airbag 72 is formed to protrude rearward from the upper half body restraining surface 80. The head receiving section 26A is configured to receive the right and left side surfaces of the head MH2, by a left restraining surface 31AL and a right restraining surface 31AR which cover the left and right sides of the head MH2 of the driver MP2. That is, even in the steering wheel airbag device M2 of the second embodiment, the head receiving section 26A is arranged to protrude from the upper half body restraining surface 80 toward the driver MP2 side on the rear side upon completion of inflation of the airbag 72. In other words, the separation distance between the head receiving section 26A and the head MH2 of the driver MP2 seated on the driver's seat can be made relatively small. Therefore, the head MH2 of the driver MP2 moving obliquely forward at the time of an oblique collision or an offset collision of the vehicle can be quickly and accurately received by the left restraining surface 31AL or the right restraining surface 31AR of the head receiving section 26A. Even in the steering wheel airbag device M2 of the second embodiment, in the airbag 72 which is completely inflated, the upper half body restraining surface 80 is disposed at a position on the front side of the head receiving section 26A, and does not have large irregularities. Thus, it is possible to widely and accurately receive the upper half body UB2 (specifically, the region below the head MH2) of the driver MP2 moving forward upon completion of the inflation of the airbag 72, by the upper half body restraining surface 80.

Therefore, even in the steering wheel airbag device M2 of the second embodiment, the head MH2 of the driver MP2 moving obliquely forward can be protected smoothly by the completely inflated airbag 72.

In particular, the steering wheel airbag device can set the distance between the occupant and the member on the vehicle body side to be smaller than that in the passenger seat airbag device. Therefore, without largely reducing the thickness dimension of the airbag main body, the upper half body of the occupant (driver) is received by the completely inflated airbag main body with good cushioning property. Further, by the inflated head receiving section protruding rearward from the airbag main body, the airbag of the present invention is configured to receive the occupant's head, and is more preferably applied to the steering wheel airbag device so that the upper half body including the head of the occupant (driver) seated on the driver's seat can be accurately protected by the inflated airbag.

What is claimed is:

1. An airbag device comprising:
an airbag stored in a storage part configured to be provided in front of an occupant seated on a seat of a vehicle, the airbag configured to deploy and inflate to protrude toward a rear side of the vehicle by flowing of an inflation gas therein, to protect the occupant, wherein:
the airbag has an occupant protecting section on a rear surface of the airbag, the occupant protecting section is configured to protect the occupant at a time of completion of inflation;
the occupant protecting section includes:
an upper half body restraining surface, configured to be disposed in front of the occupant at the time of completion of inflation, the upper half body restraining surface is configured to receive an upper half body of the occupant; and
a head receiving section formed in a left region and a right region of a center in a left-right direction of the occupant protecting section to protrude rearward from the upper half body restraining surface, in a region above the upper half body restraining surface, the head receiving section having a left restraining surface and a right restraining surface configured to receive a side surface of a head; and
the head receiving section is configured so that a part between the left restraining surface and the right restraining surface upon completion of inflation is continued from the upper half body restraining surface, wherein:
the airbag includes:
an airbag main body in which a lower side of the rear surface upon completion of inflation is set as the upper half body restraining surface; and the head receiving section formed to partially protrude from an upper side on the rear surface of the airbag main body upon completion of inflation;

the head receiving section includes a left restraining section having the left restraining surface, and a right restraining section having the right restraining surface; and the left restraining section and the right restraining section are arranged such that base portions thereof upon completion of inflation are positioned on a center side in the left-right direction relative to a left edge and a right edge on the rear surface of the airbag main body and protrude rearward from the upper half body restraining surface, in a state in which the airbag upon completion of inflation is viewed from above, wherein the left restraining surface and the right restraining surface are inclined with respect to a front-rear direction so as to be expanded toward a front end side when the inflation of the airbag is completed, and wherein the left restraining surface and the right restraining surface are configured such that the base portions are brought into contact with each other when the inflation of the airbag is completed.

2. The airbag device according to according to claim 1, wherein
the airbag is folded and stored in the storage part which is provided in an instrument panel configured to be disposed in front of the occupant seated on the seat which is a passenger seat.

3. The airbag device according to claim 1, wherein
the airbag is folded and stored in the storage part which is provided in a steering wheel configured to be disposed in front of the occupant seated on the seat which is a driver's seat.

4. An airbag device comprising:
an airbag stored in a storage part configured to be provided in front of an occupant seated on a seat of a vehicle, the airbag configured to deploy and inflate to protrude toward a rear side of the vehicle by flowing of an inflation gas therein, to protect the occupant, wherein:

the airbag has an occupant protecting section on a rear surface of the airbag, the occupant protecting section is configured to protect the occupant at a time of completion of inflation;

the occupant protecting section includes:
an upper half body restraining surface, configured to be disposed in front of the occupant at the time of completion of inflation, the upper half body restraining surface is configured to receive an upper half body of the occupant; and a head receiving section formed in a left region and a right region of a center in a left-right direction of the occupant protecting section to protrude rearward from the upper half body restraining surface, in a region above the upper half body restraining surface, the head receiving section having a left restraining surface and a right restraining surface configured to receive a side surface of a head; and the head receiving section is configured so that a part between the left restraining surface and the right restraining surface upon completion of inflation is continued from the upper half body restraining surface, wherein:

the airbag includes:
an airbag main body in which a lower side of the rear surface upon completion of inflation is set as the upper half body restraining surface; and the head receiving section formed to partially protrude from an upper side on the rear surface of the airbag main body upon completion of inflation;

the head receiving section includes a left restraining section having the left restraining surface, and a right restraining section having the right restraining surface;

the left restraining section and the right restraining section are arranged such that base portions thereof upon completion of inflation are positioned on a center side in the left-right direction relative to a left edge and a right edge on the rear surface of the airbag main body and protrude rearward from the upper half body restraining surface, in a state in which the airbag upon completion of inflation is viewed from above; and recessed portions recessed inward in the left-right direction between an upper part of a rear side wall section and the rear side wall section in outer regions in the left-right direction of the left restraining section and the right restraining section.

5. The airbag device according to claim 4, wherein
the left restraining surface and the right restraining surface are inclined with respect to a front-rear direction so as to be expanded toward a front end side when the inflation of the airbag is completed.

6. The airbag device according to claim 5, wherein
the left restraining surface and the right restraining surface are configured such that the base portions are brought into contact with each other when the inflation of the airbag is completed.

7. The airbag device according to according to claim 4, wherein
the airbag is folded and stored in the storage part which is provided in an instrument panel configured to be disposed in front of the occupant seated on the seat which is a passenger seat.

8. The airbag device according to claim 4, wherein
the airbag is folded and stored in the storage part which is provided in a steering wheel configured to be disposed in front of the occupant seated on the seat which is a driver's seat.

* * * * *